US012265062B2

(12) United States Patent
Ge et al.

(10) Patent No.: US 12,265,062 B2
(45) Date of Patent: Apr. 1, 2025

(54) THROUGH TUBING CEMENT EVALUATION USING CONVERTED MULTIPOLE RESONANCE MODE

(71) Applicant: Halliburton Energy Services, Inc., Houston, TX (US)

(72) Inventors: Yao Ge, Houston, TX (US); Ruijia Wang, Houston, TX (US); Ho Yin Ma, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 272 days.

(21) Appl. No.: 17/804,870

(22) Filed: Jun. 1, 2022

(65) Prior Publication Data

US 2023/0393099 A1 Dec. 7, 2023

(51) Int. Cl.
*G01N 29/12* (2006.01)
*E21B 47/005* (2012.01)
(Continued)

(52) U.S. Cl.
CPC .......... *G01N 29/12* (2013.01); *E21B 47/005* (2020.05); *E21B 47/14* (2013.01); *G01H 13/00* (2013.01);
(Continued)

(58) Field of Classification Search
CPC .... G01N 29/12; G01N 29/348; G01N 29/036; G01N 2291/014; E21B 47/005; E21B 47/14; G01H 13/00
(Continued)

(56) References Cited

U.S. PATENT DOCUMENTS 11,091,999 B2 * 8/2021 Zhang .................. E21B 47/005
11,525,936 B2 * 12/2022 Wang ...................... G01V 1/46
(Continued)

FOREIGN PATENT DOCUMENTS

WO WO-2005014975 A1 * 2/2005 ......... E21B 47/0005
WO WO-2016187242 A1 * 11/2016 ........... E21B 47/005

OTHER PUBLICATIONS

International Search Report and Written Opinion for International Patent Application No. PCT/US022/072669 dated Feb. 27, 2023.

*Primary Examiner* — Stephanie E Bloss
*Assistant Examiner* — Kevin C Butler
(74) *Attorney, Agent, or Firm* — John Wustenberg; C. Tumey Law Group PLLC

(57) ABSTRACT

Methods to perform through tubing cement evaluation using converted multipole resonance modes. A first acoustic transmission is emitted outward toward the cement such that a portion of the first acoustic transmission penetrates the cement. The receiver array detects the first acoustic response derived from the first acoustic transmission. The system then determines the multimode wellbore resonance based on the first acoustic response. In response to the first acoustic transmission penetrating the cement, a first mode of the multimode wellbore resonance is converted into a second mode different from the first mode. The receiver array detects a second acoustic response derived from the converted mode of the multimode wellbore resonance. The system determines the converted mode using the second acoustic response. A property of the cement is evaluated based on the multimode wellbore resonance and the converted mode.

20 Claims, 20 Drawing Sheets

(51) Int. Cl.
 *E21B 47/14* (2006.01)
 *G01H 13/00* (2006.01)
 *G01N 29/036* (2006.01)
 *G01N 29/34* (2006.01)

(52) U.S. Cl.
 CPC ......... *G01N 29/036* (2013.01); *G01N 29/348* (2013.01); *G01N 2291/014* (2013.01)

(58) Field of Classification Search
 USPC .......................................................... 73/579
 See application file for complete search history.

(56) References Cited

U.S. PATENT DOCUMENTS

| | | | |
|---|---|---|---|
| 2006/0233048 A1* | 10/2006 | Froelich | E21B 47/005 367/35 |
| 2018/0149019 A1* | 5/2018 | Bose | E21B 47/005 |
| 2019/0376380 A1* | 12/2019 | Zhang | E21B 47/005 |
| 2020/0033494 A1* | 1/2020 | Patterson | E21B 49/00 |
| 2021/0396126 A1* | 12/2021 | Wang | E21B 47/107 |
| 2021/0396900 A1* | 12/2021 | Wang | E21B 49/00 |
| 2022/0381935 A1* | 12/2022 | Cabella | E21B 47/107 |
| 2023/0175386 A1* | 6/2023 | Ge | G01V 1/50 367/35 |
| 2023/0393099 A1* | 12/2023 | Ge | E21B 47/005 |

* cited by examiner

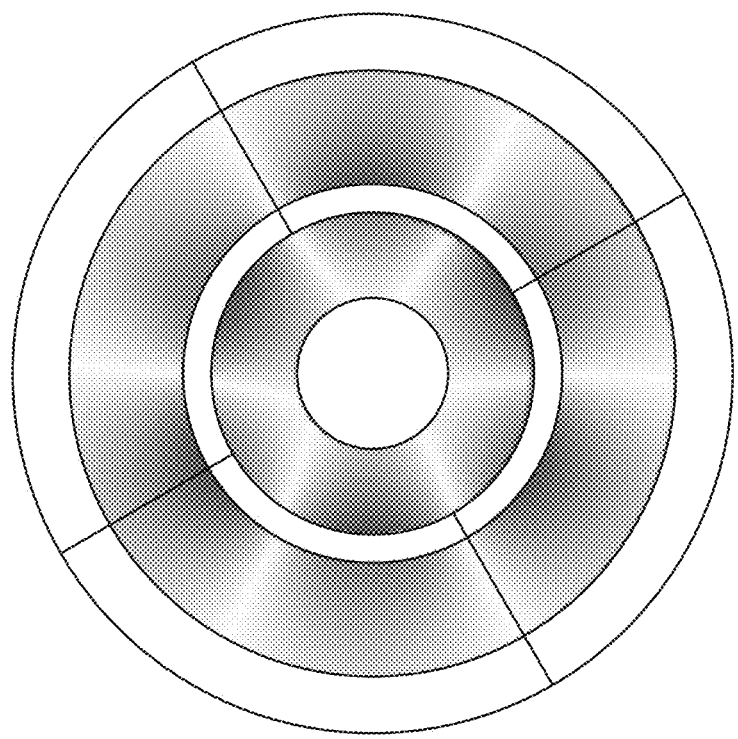
FIG. 4
| Tubing in | Casing in | First Order Dipole Mode kHz | Hexapole Mode kHz |
|---|---|---|---|
| 3.5 | 7.0 | 5.5 | 5.3 |
| 4.5 | 9.625 | 4.1 | 3.6 |
| 5.5 | 10.75 | 3.7 | 2.4 |
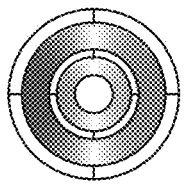 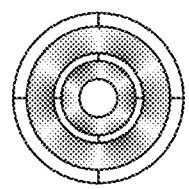
FIG. 5

Hexapole Modeshape with Y Dipole Excitation

Hexapole Modeshape with X Dipole Excitation

1700

1702 Emit first acoustic transmission inside cased wellbore

1704 Detect first acoustic response

1706 Determine multimode wellbore resonance of the first acoustic response

1708 Detect second acoustic response derived from converted mode of the multimode wellbore resonance

1710 Determine converted mode based on second acoustic response

1712 Evaluate cement property based on the multimode wellbore resonance and the converted mode

FIG.17

THROUGH TUBING CEMENT EVALUATION USING CONVERTED MULTIPOLE RESONANCE MODE

TECHNICAL FIELD

The disclosure generally relates to wellbores formed in subsurface formations, and in particular, evaluation of cement bonding condition placed in such wellbores using converted multiple resonance mode.

BACKGROUND

Through tubing cement evaluation (TTCE) detects cement bonding or the presence of a fluid channel behind a casing without removing the tubing. TTCE helps to save significant time and money without the need of pulling out the tubing. However, conventional TTCE methods are challenging because most of the energy does not penetrate the tubing, thus making it difficult to evaluate the cement bonding behind the casing.

Multiple methods for TTCE have been developed. However, such conventional TTCE methods lack the sensitivity to detect smaller channels. The reason is that conventional TTCE methods usually employ lower frequency to achieve low attenuation and higher penetration through the tubing. As a result, the wavelength is much longer than the dimension of the small channel, thus failing to provide the sensitivity needed to detect small channels.

BRIEF DESCRIPTION OF THE DRAWINGS

Embodiments of the disclosure may be better understood by referencing the accompanying drawings.

FIG. 3A shows an illustrative received modeshape of the excited mode of FIG. 2B, while

FIG. 4 shows the hexapole modeshape from the simulation.

FIG. 5 is a chart showing the resonance frequency for the dipole mode and hexapole mode for different tubing/casing configurations.

11A is a graph plotting the original signal from the actual tool and source. FIG. 11B is another graph showing the processed signal after removal of the baseline signal in the time domain, while FIG. 11C shows the same in the frequency domain.

FIG. 17 is a flow chart of a method, according to illustrative embodiments of the present disclosure.

DESCRIPTION OF ILLUSTRATIVE EMBODIMENTS

Figure 1:
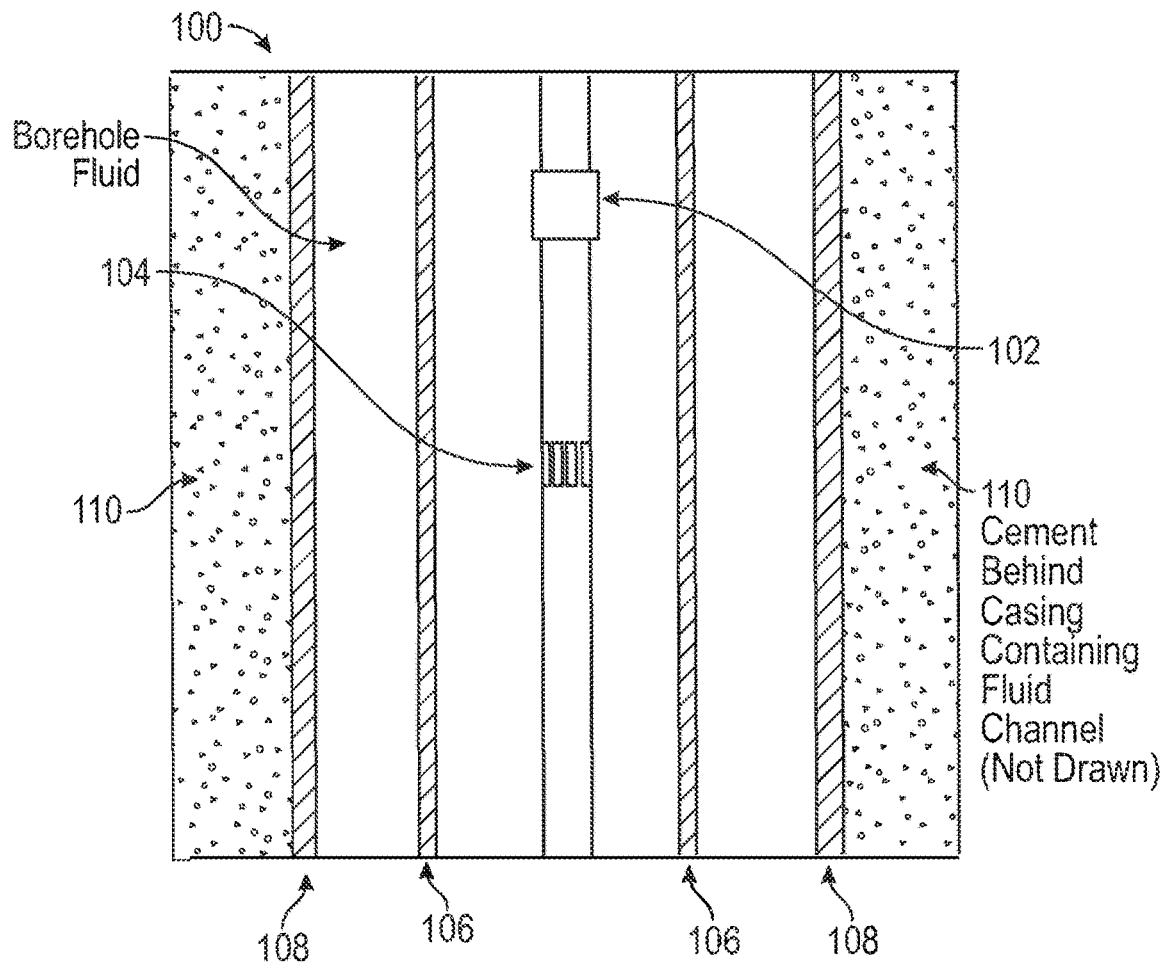
FIG. 1 is a schematic of a tool configuration, according to certain illustrative embodiments of the present disclosure.

Embodiments and methods of the present disclosure are utilized conduct through tubing cement evaluation using converted multipole resonance modes. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to implement such feature, structure, or characteristic in connection with other embodiments whether or not explicitly described.

As will be described in further detail below, the present disclosure is directed to systems and method to perform TTCE using converted multipole resonance modes. Such methods provide higher sensitivity to small fluid channel as compared to conventional TTCE methods. In a generalized method, a downhole tool is conveyed along a tubing positioned in a casing which forms an annulus between the casing and wellbore wall. The casing is cemented with cement having an unknown bonding condition. The downhole tool includes at least one acoustic transmitter and receiver array. A first acoustic transmission is emitted outward toward the cement such that at least a portion of the first acoustic transmission penetrates the cement. The receiver array then detects the first acoustic response derived from the first acoustic transmission. The system then determines the multimode wellbore resonance based on the first acoustic response. In response to the first acoustic transmission penetrating the cement, a first mode of the multimode wellbore resonance is converted into a second mode different from the first mode (i.e., the converted mode). The receiver array also detects a second acoustic response derived from the converted mode of the multimode wellbore resonance. The system then determines the converted mode using the second acoustic response. A property of the cement is then evaluated based on the multimode wellbore resonance and the converted mode.

Thus, the illustrative methods described herein use a converted multipole resonance mode to detect fluid channel outside a cemented casing. In some cases, exciting a coupled resonance mode at the same frequency band generate a converted mode with enhanced amplitude. In other embodiments, the acoustic responses/signals from azimuthal receivers can be decomposed to enhance a specific multipole mode. In yet other methods, the intrinsic multipole mode caused by the tool or source can be removed to improve the channel detection sensitivity.

The description that follows includes example systems, methods, techniques, and program flows that embody embodiments of the disclosure. However, it is understood that this disclosure may be practiced without these specific details. For instance, this disclosure refers to different example transmitters and receivers (e.g., dipole, monopole, etc.) in illustrative examples. Embodiments of this disclosure can also be applied to other types of transmitters and receivers. As another example, this disclosure refers to evaluation of the cement bonding condition. Embodiments of this disclosure can also be applied to other material outside the casing, other properties of the cement or material, etc.

Illustrative embodiments can be used for various downhole well logging applications, including TTCE. For instance, example embodiments can include a transmitter and receiver (e.g., dipole) positioned in a wellbore for acoustic well logging (including anisotropy measurement, formation stress estimation, cement bond evaluation, etc.).

In addition to the length of the wavelength, another challenge for accurate TTCE can include eccentricity, which can occur from the production tubing being off-center within the casing (which can be due to various factors, such as the curvature of the production tubing, well inclination, etc.). As the severity of the eccentricity increases, the amplitude, frequency and modeshape of the resonance mode are affected. Such effects can adversely affect cement evaluation. Thus, conventional approaches based on the assumption of no eccentricity may not provide accurate evaluations when there is eccentricity. Some illustrative embodiments described herein can be used to overcome the effect of eccentricity. In some implementations, eccentricity can be defined as displacement of at least one of the production tubing and the downhole tool away from the centering of the casing. In some implementations, the production tubing and the downhole tool can be assumed to be concentric with centralizers used to center the production tubing and the downhole tool. As further described below, example embodiments can include operations that can account for this eccentricity.

Conventional TTCE includes a monopole excited borehole resonance. However, a monopole resonance mode can change with eccentricity, thereby making isolation of the resonance in the time and frequency domain difficult. Thus, some example embodiments include the use of a dipole resonance mode—which can have several advantages over a conventional monopole resonance mode. As further described below, a dipole resonance mode can provide an alternative approach to TTCE to complement the monopole result for a more accurate evaluation of the cement.

Some embodiments can include a dipole mode that can be excited with a cross dipole (X dipole and Y dipole). In some implementations, a late time acoustic signal can be detected and transformed into the frequency domain. The peaks in the frequency domain can indicate the resonance modes of the wellbore. The frequency is related to, for example, the tubing and casing radius, thickness and acoustic property of the fluid and pipes. The casing-sensitive modes can be identified. The amplitude of the mode can then be used to perform cement evaluation (e.g., cement bonding) because the amplitude to the converted mode corresponds to the size of fluid channels in the cement bond. In the case of partial bonded case (casing with a fluid channel), the cross dipole response can be rotated according to the channel direction to obtain desired response. Using a dipole mode, only one mode is be needed over the eccentricity from 0% up to approximately 90%. Also, eccentricity has limited effects on TTCE when using the dipole mode. Thus, as further described below, example embodiments can include the use of a low frequency dipole mode to provide for a more accurate TTCE, wherein the definition of low frequency can vary (e.g., 10 kiloHertz, 5 kiloHertz, etc.).

Some existing TTCE methods use borehole resonance modes to detect cement bonding. The resonance mode includes monopole, dipole and any higher order modes. These modes are excited from a transmitter (e.g., acoustic source) according to their mode shape and resonance frequency. Embodiments and methods of the present disclosure, however, use the converted mode which is not directly excited from the source. This converted mode is developed due to the asymmetry of the system, for example, the presence of fluid channel behind the casing. Hence it can be used for through tubing fluid channel detection.

In some cases, the source can excite a borehole resonance mode, and this mode is then converted to another mode which is used for channel detection. The presence of an excited resonance mode helps to increase the amplitude of the converted mode. However, it is possible that a resonance mode is not present near the frequency band of the converted mode. However, in such cases, the converted mode can still be used to detect the channel, but with a lower amplitude.

Further, as described herein, an example of a dipole converted hexapole mode is used. However, the embodiments are not limited to dipole and hexapole modes. Another example of a monopole excited quadrupole mode is also discussed herein.

FIG. 1 is a schematic of a tool configuration, according to certain illustrative embodiments of the present disclosure. Tool 100 includes at least one transmitter 102 and an array of azimuthal receivers 104. The transmitter 102 transmits an acoustic wave which interacts with the borehole and received by the azimuthal receivers 104. The tool 100 is placed inside a tubing 106 and a casing 108. The casing 108 is cemented using cement 110, but with potential fluid channels present. The purpose of the present disclosure is the detection of fluid channels in the cement 110. In certain embodiments, transmitter 102 can be a monopole, dipole or higher order multipole transmitter. The azimuthal receiver signals can be decomposed according to the order of the multipole which is of interest, such as described in co-pending Patent Cooperation Treaty Application No. PCT/US22/70022, entitled "THROUGH TUBING CEMENT EVALUATION BASED ON ROTATABLE TRANSMITTER AND COMPUTATIONAL ROTATED RESPONSES," filed on Jan. 4, 2022, owned by the Assignee of the present disclosure Halliburton Energy Services, Inc., which is hereby incorporated by reference in its entirety.

Figure 2A:
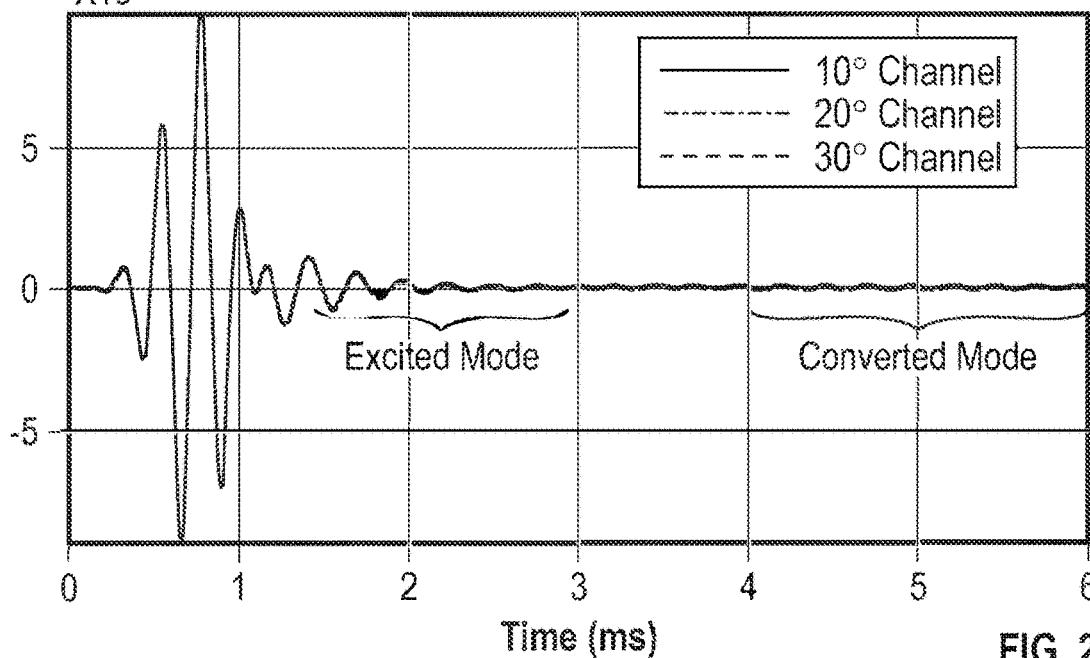
FIGS. 2A, 2B and 2C illustrates time domain graphs of received acoustic responses/signals (FIG. 2A) showing the excited mode (FIG. 2B) and converted mode (FIG. 2C).
Figure 2B:
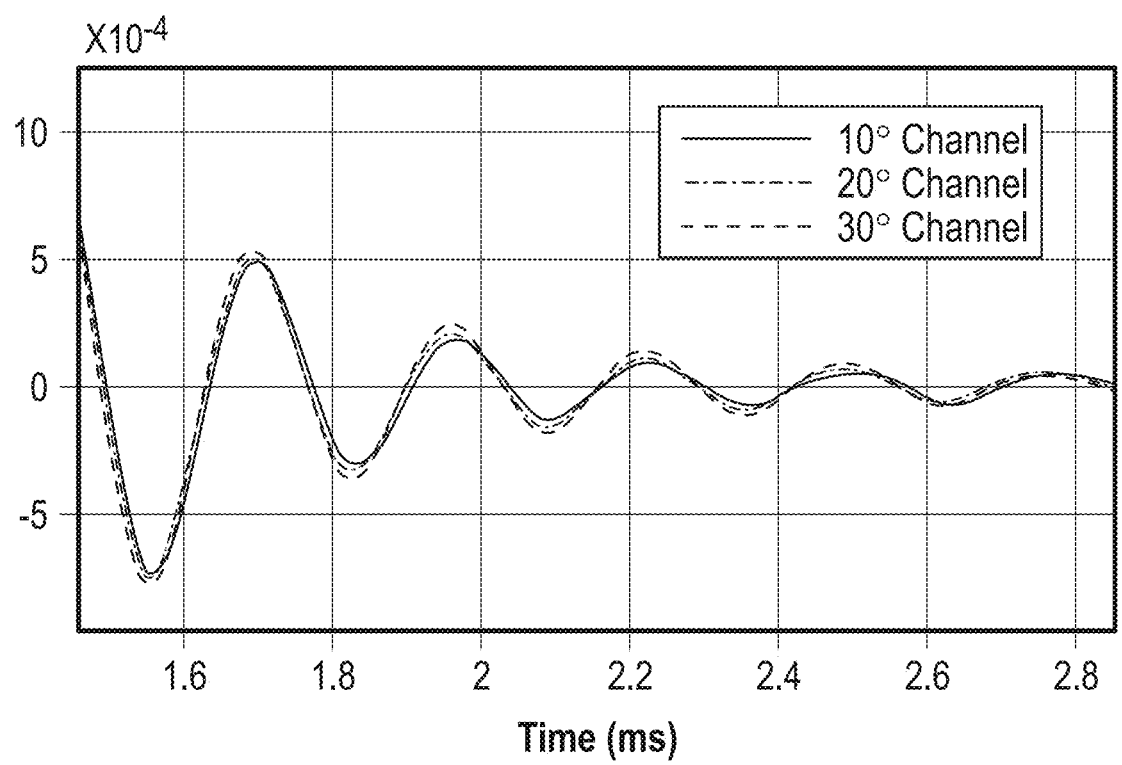
Figure 2C:
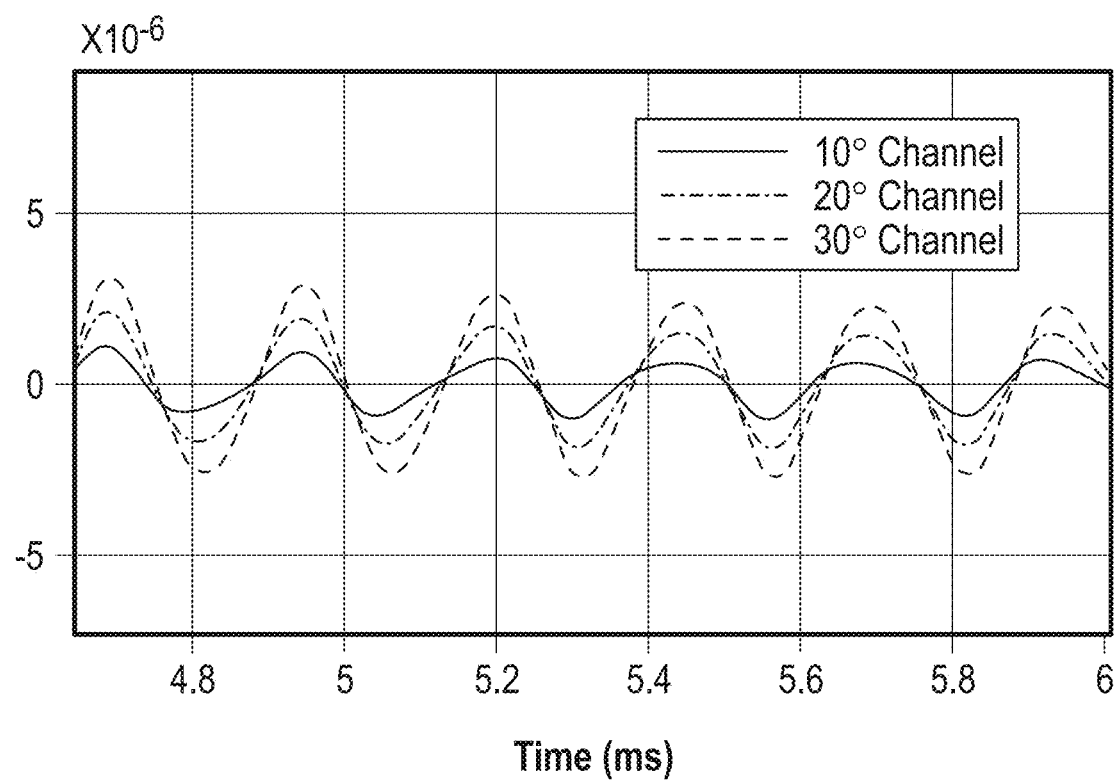

FIGS. 2A, 2B and 2C illustrates time domain graphs of received acoustic responses/signals (FIG. 2A) showing the excited mode (FIG. 2B) and converted mode (FIG. 2C). The acoustic response/signal is created with a dipole source with frequency at 4 kHz. Since there is a resonance dipole mode near 4 kHz, the dipole resonance mode is excited as shown in FIG. 2B. The dipole mode has a relatively higher amplitude and also a higher decay (compared to the converted mode of FIG. 2C) and hence it dominants the earlier signal from 1.5 to 3 ms. In a later arrival time after 4 ms, a converted mode is developed.

Figure 3A:
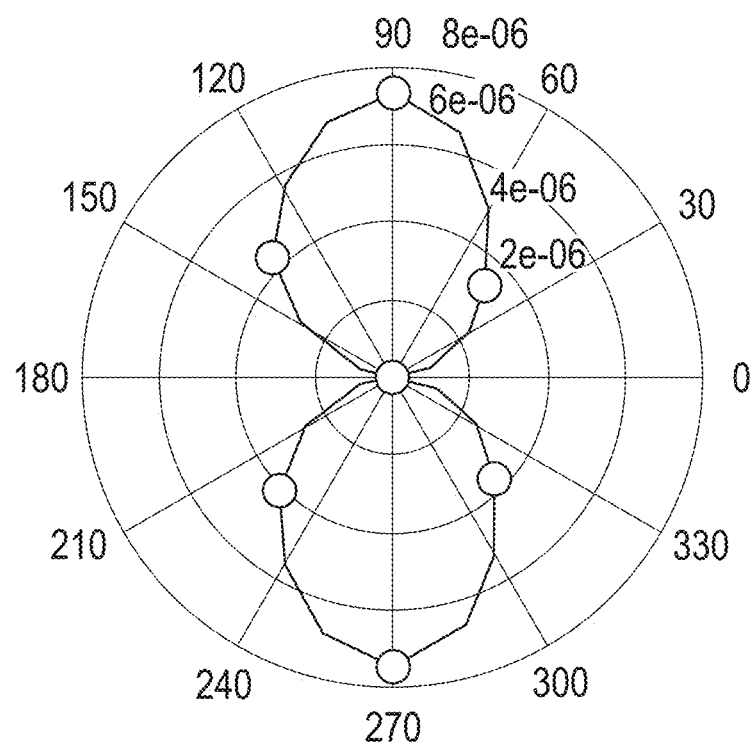
Figure 3B:
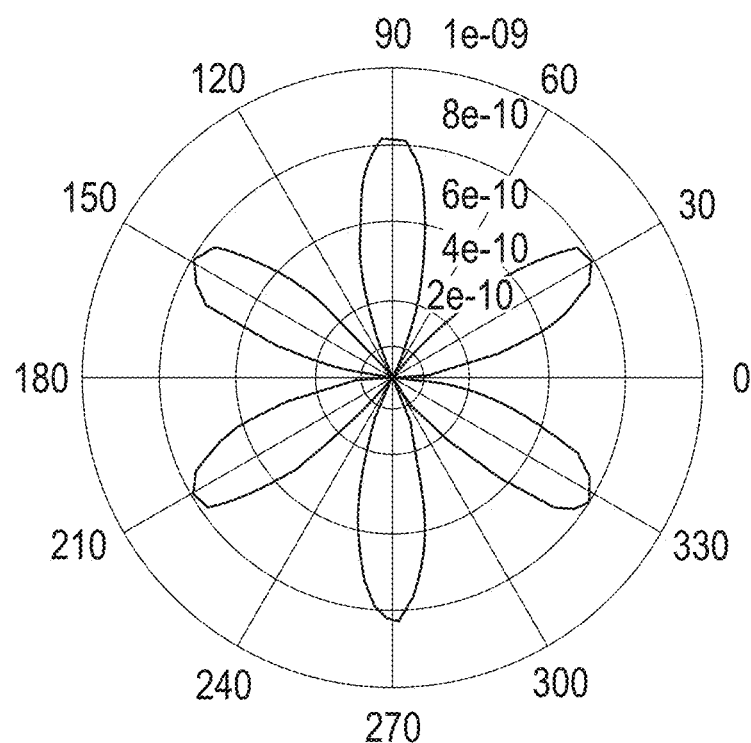
FIG. 3B shows the received modeshape of the converted mode of FIG. 2C from the azimuthally received modeling signal.

The modeshape can be plotted based on the amplitude of a specific frequency (modal frequency of the mode of interest) at different azimuthal receiver directions, as will be described below with reference to FIGS. 3A and 3B. The excited mode is a dipole mode, with direction aligned with the dipole source direction. The converted mode is a hexapole mode, with direction aligned with the dipole direction.

By comparing the relative signal amplitude for the three channel sizes (see FIGS. 2B and 2C), the converted hexapole mode has a higher sensitivity (compared to the excited dipole mode) to small channels from 10° to 30°. This is because the hexapole mode is a tubing vibration mode with a forced vibration in the inner and outer annulus as shown in FIGS. 3A and 3B. FIG. 3A shows an illustrative received modeshape of the excited mode of FIG. 2B, while FIG. 3B shows the received modeshape of the converted mode of FIG. 2C from the azimuthally received modeling signal. FIG. 4 shows the hexapole modeshape from the simulation. With reference back to FIGS. 3A and 3B, the hexapole mode is being converted when there is an asymmetry in the system. Since the hexapole mode has narrow lobes with each of them covering 60°, it is more sensitive to small channels than dipole.

In this example, the dipole mode and hexapole mode are chosen because they are in the same frequency bands. FIG. 5 is a chart showing the resonance frequency for the dipole mode and hexapole mode for different tubing/casing configurations. As shown in FIG. 5, for smaller or larger tubing/casing configurations, the hexapole mode is mostly in similar frequency as the dipole mode. As a result, the dipole mode can be excited as a resonance and converted to hexapole mode, thus resulting in a hexapole mode having a good signal to noise ratio.

Figure 6A:
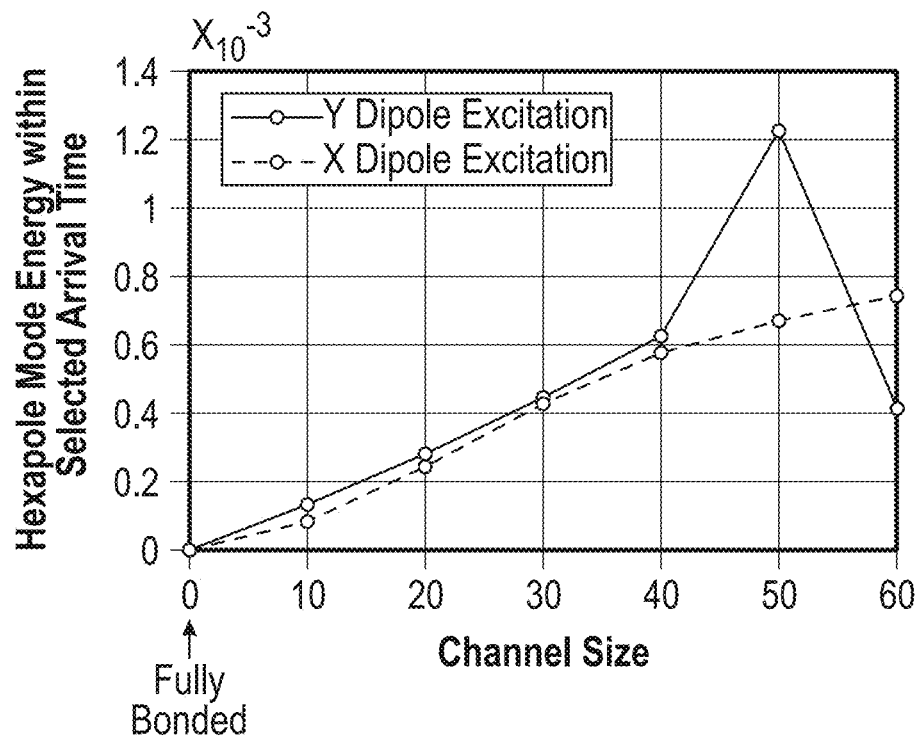
FIGS. 6A, 6B and 6C show the relationship between the hexapole mode and channel size.
Figure 6B:
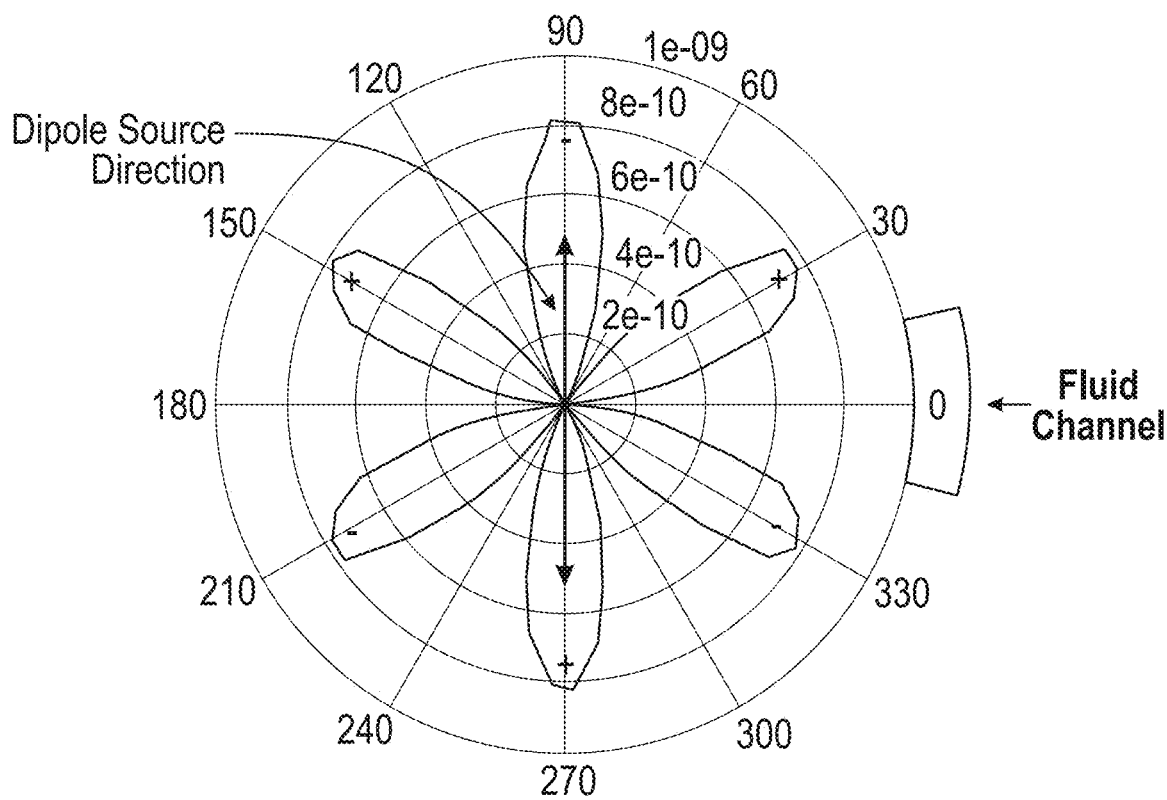
Figure 6C:
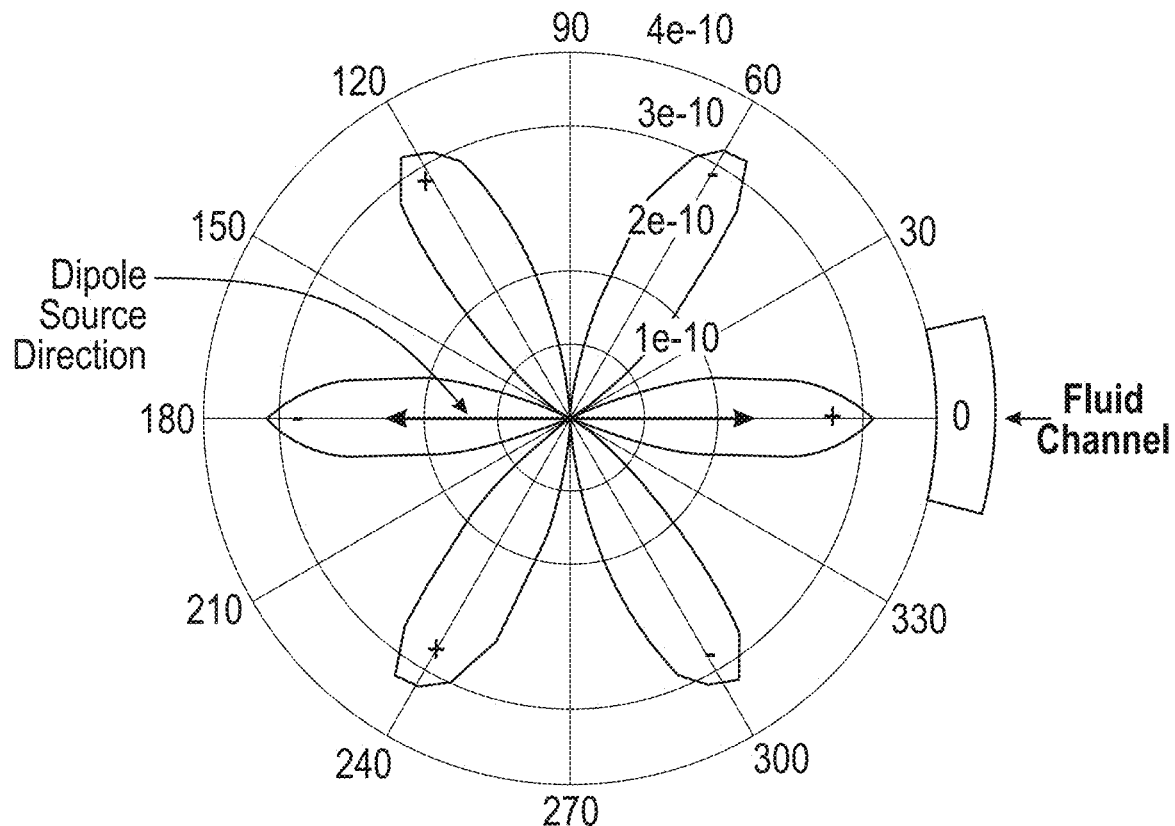

FIGS. 6A, 6B and 6C show the relationship between the hexapole mode and channel size. FIG. 6A is a graph plotting the hexapole energy generated from both X and Y dipole sources. X dipole means the source direction is aligned with the channel direction; Y dipole means the source direction is orthogonal to the channel direction. In this case, the tool and tubing are concentric with the casing.

When the channel size is 0°, the casing is fully bonded by cement. The converted hexapole mode also has zero amplitude, this is because there is no asymmetry in the system and the hexapole mode is not developed. When channel size increases, the amplitude of the hexapole mode is also increased. This is because the increased channel size creates more asymmetry in the system. However, the Y dipole excited hexapole energy suddenly decreases at 60°. This is because the fluid channel is located in between a positive and a negative lobe, which is shown in FIG. 6B (hexapole modeshape with Y dipole excitation). Hence a larger channel covering both positive and negative lobes creates more symmetry than asymmetry. On the other hand, the X dipole excited hexapole covers only one lobe as shown in FIG. 6C (hexapole modeshape with X dipole excitation), so increasing the channel size up to 60° still introduces more asymmetry and hence the hexapole energy increases.

Figure 7:
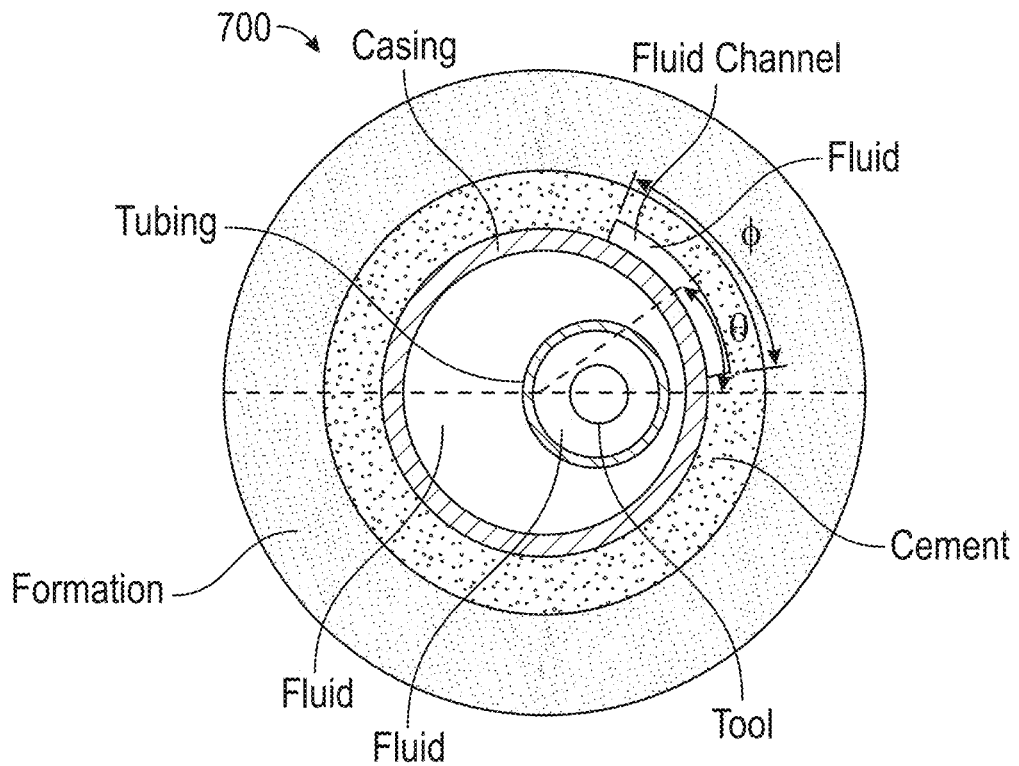
FIG. 7 shows the schematics of a generalized tubing/casing configuration and bonding condition for TTCE applications.

Before discussing the signal processing, FIG. 7 is provided which shows a generalized configuration and its notation. FIG. 7 shows the schematics of a generalized tubing/casing configuration 700 and bonding condition for TTCE applications. FIG. 7 shows configuration 700 includes a tool, tubing, casing, cement, fluid channel within the cement, and the formation. Assuming there is a single channel behind the casing, θ is the channel direction relative to the horizontal dash-dot line, and y is the channel size.

The X and Y dipoles have a different response and the fluid channel direction is unknown. Hence, it is not possible to determine if a dipole direction is aligned in X or Y direction. An illustrative workflow is used to compute the overall hexapole amplitude response for a source pointing at all directions within a 360 degree revolution (see FIGS. 8A, 8B and 8C). First, a hexapole rotation is performed from the azimuthal receiver signals and plotted in FIG. 8A. The X and Y dipole source and response are projected to a specific angle using multipole decomposition such as described in co-pending Patent Cooperation Treaty Application No. PCT/US22/70022, entitled "THROUGH TUBING CEMENT EVALUATION BASED ON ROTATABLE TRANSMITTER AND COMPUTATIONAL ROTATED RESPONSES," filed on Jan. 4, 2022, also owned by the Assignee of the present application, Halliburton Energy Services Inc., the disclosure of which is incorporated herein by reference. This is calculated for all angles within a revolution. Transforming the time-domain hexapole decomposed signal into the frequency domain, FIG. 8A is generated for the responses pointing to multiple angles over 360°.

Figures 8A, 8B:
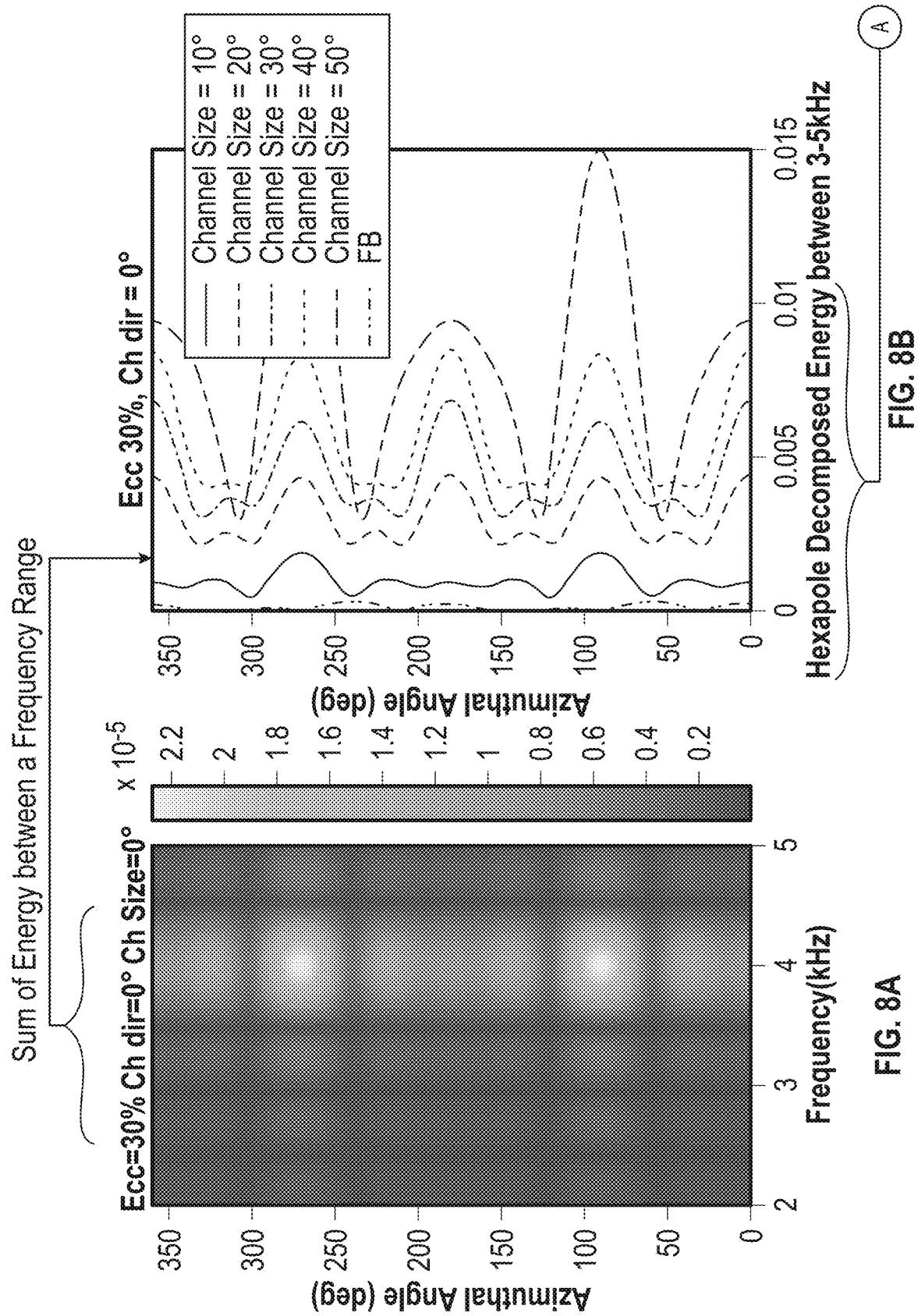
FIGS. 8A, 8B and 8C are plots showing a method to compute overall hexapole amplitude for an excitation over 360 degrees.
Figure 8C:
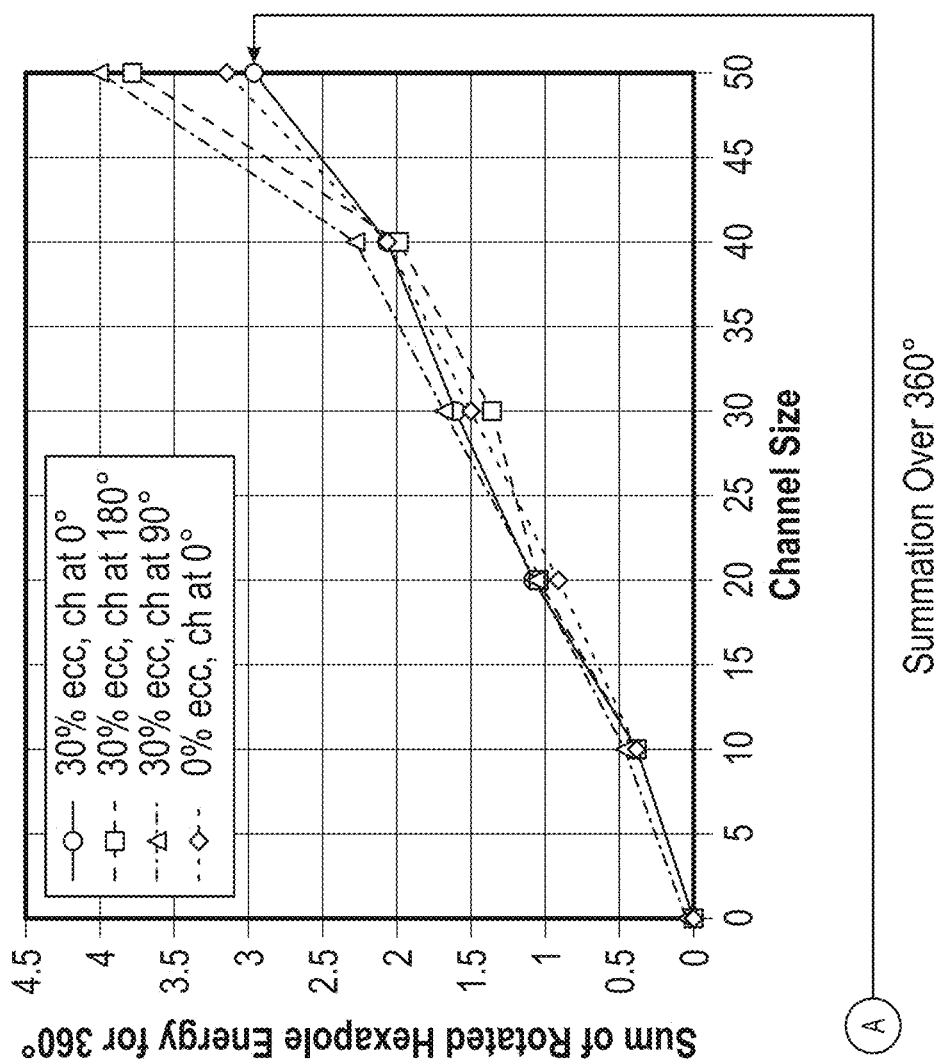

Taking the energy within a frequency range (which is selected to cover the frequency of the converted mode), the energy for the decomposed response from all directions is summed to generate an amplitude vs. angle curve as shown in FIG. 8B. In this specific example, the fully bonded (FB) curve in FIG. 8B is generated from a fully bonded case (channel size=0°) with 30% eccentricity. Other curves in FIG. 8B are computed from models with different channel sizes. Then, the amplitude vs. channel size curve can be summed over 360° to generate one curve (the curves in FIG. 8B are summed to be the curved labeled as Ecc 30%, ch dir(channel direction)=0 degrees in FIG. 8C) as shown in FIG. 8C. Similarly other curves for different channel directions are plotted in FIG. 8C.

In certain illustrative embodiments, eccentricity is evaluated as a percentage, which is the ratio between tool and tubing offset (from concentric position) and the annulus thickness between tubing and casing (in a concentric configuration). Hence a 0% eccentricity means the tool and tubing is concentric with the casing. A 100% eccentricity means that the tubing is touching the casing.

FIG. 8C shows that for low eccentricity (30%), the channel direction does not affect the hexapole energy significantly. The eccentricity also has little impact on the hexapole energy, because the curve with eccentricity almost coincides with the curve without eccentricity (0% eccentricity).

Figure 9A:
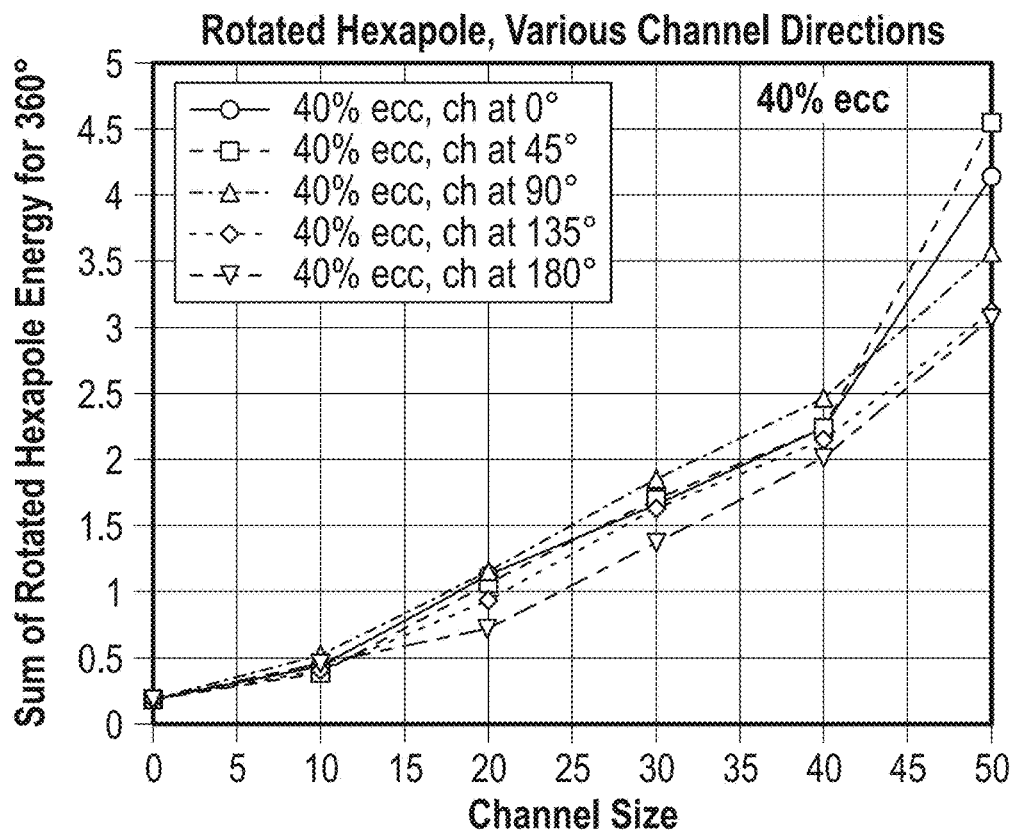
FIGS. 9A-9F are graphs plotting the hexapole energy vs channel size curve for various eccentricities.
Figure 9B:
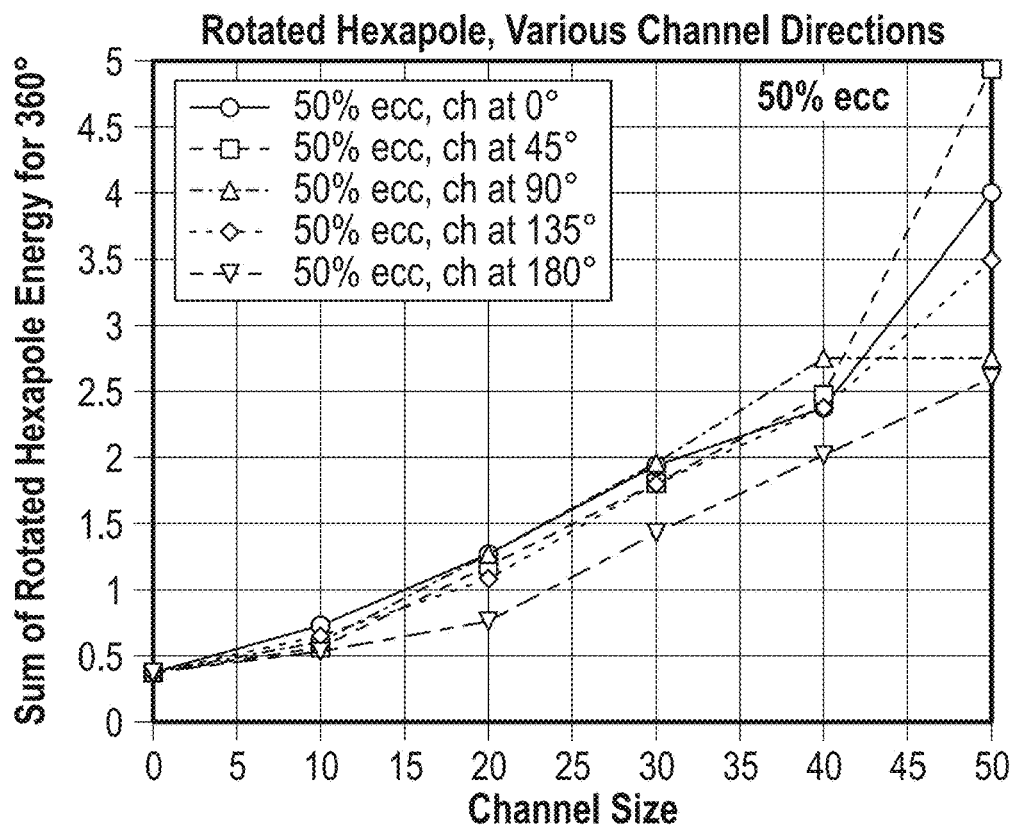
Figure 9C:
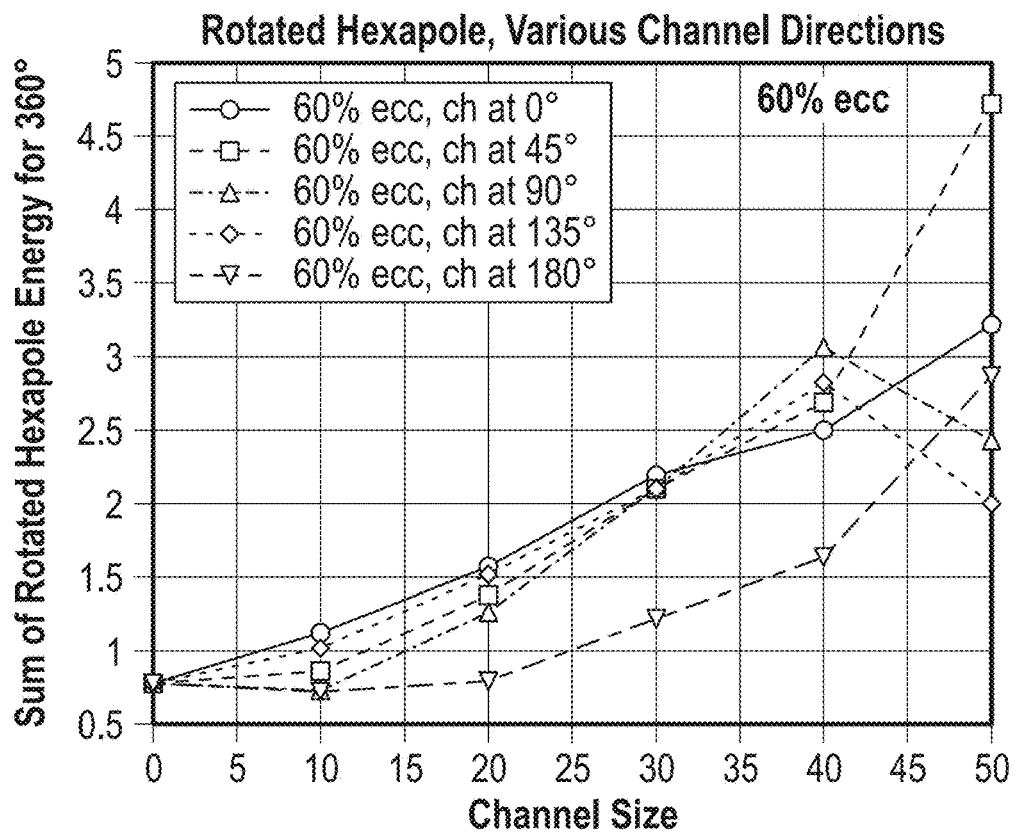
Figure 9D:
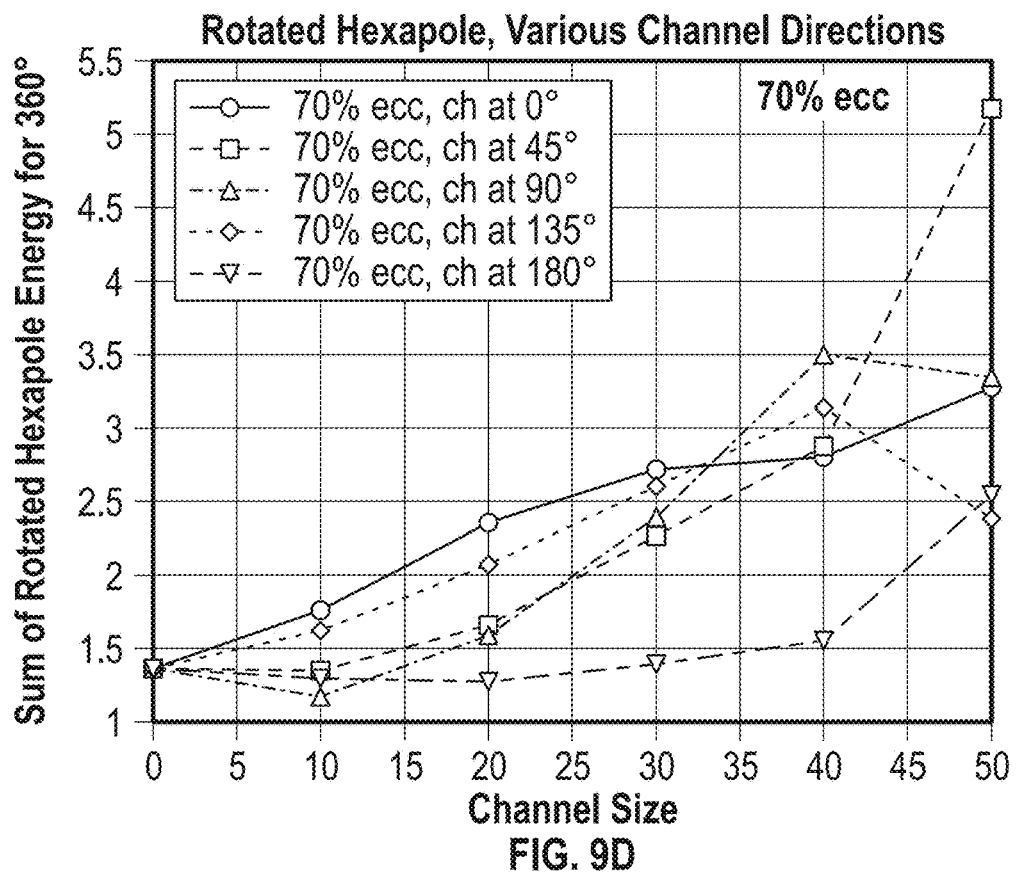
Figure 9E:
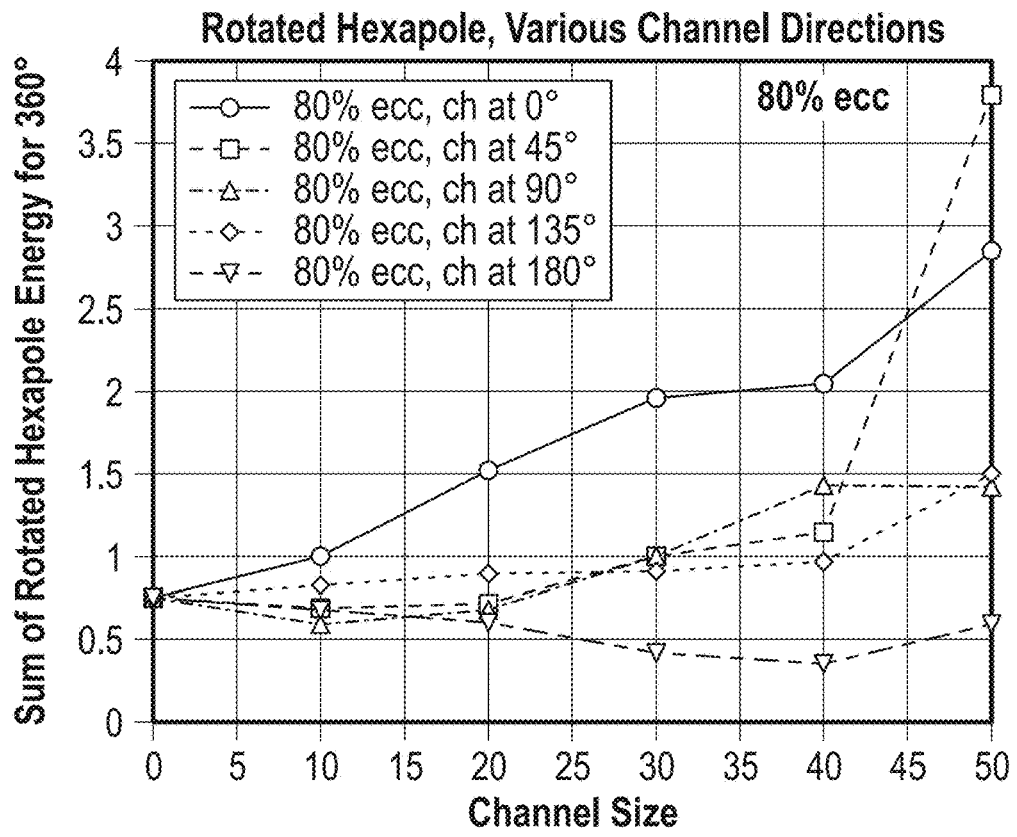
Figure 9F:
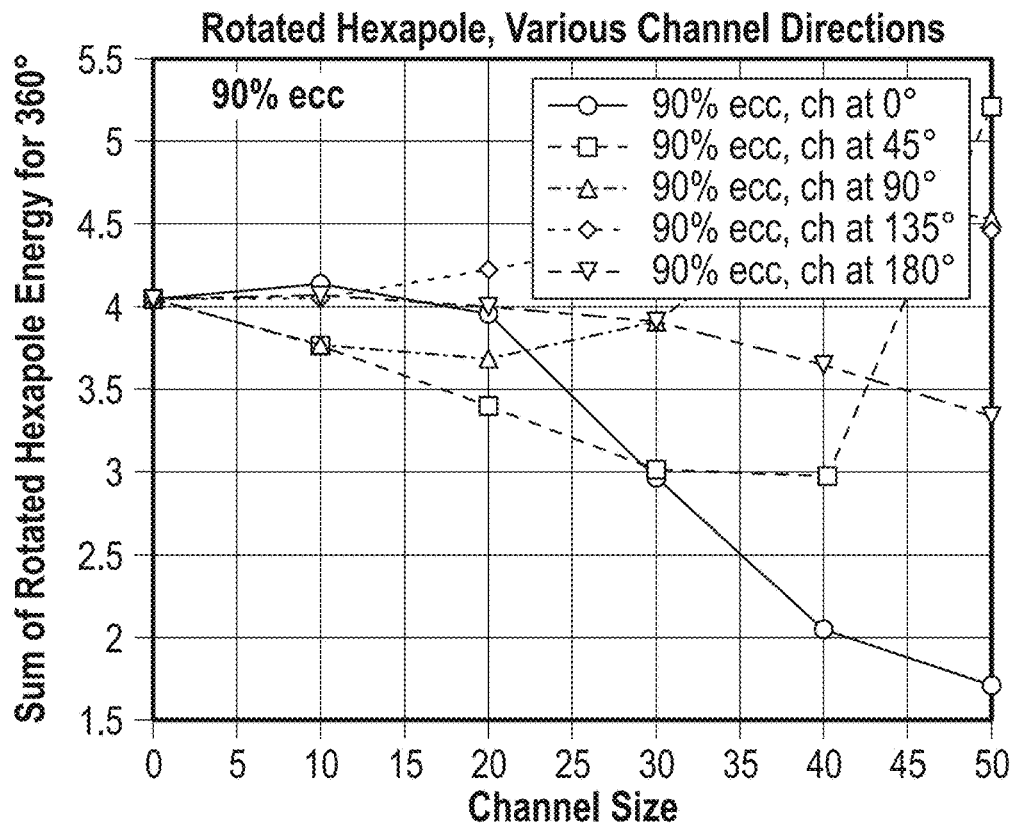

FIGS. 9A-9F are graphs plotting the hexapole energy vs channel size curve for various eccentricities. FIG. 9A plots the hexapole energy vs. channel size for 40% eccentricity. FIG. 9B plots the hexapole energy vs. channel size for 50% eccentricity. FIG. 9C plots the hexapole energy vs. channel size for 60% eccentricity. FIG. 9D plots the hexapole energy vs. channel size for 70% eccentricity. FIG. 9E plots the hexapole energy vs. channel size for 80% eccentricity. FIG. 9F plots the hexapole energy vs. channel size for 90% eccentricity. It is observed that for eccentricity below 50% eccentricity, the curves for different channel directions have similar trends which are also monotonically increasing. Hence with a hexapole mode energy obtained, the channel size can be uniquely obtained. For higher eccentricity, the curves for different channel directions do not follow the same trend and sometimes do not have a monotonically increasing trend. Hence, in certain illustrative embodiments, further corrections may need to identify the channel size with the knowledge of the eccentricity measured in other means.

Figure 10A:
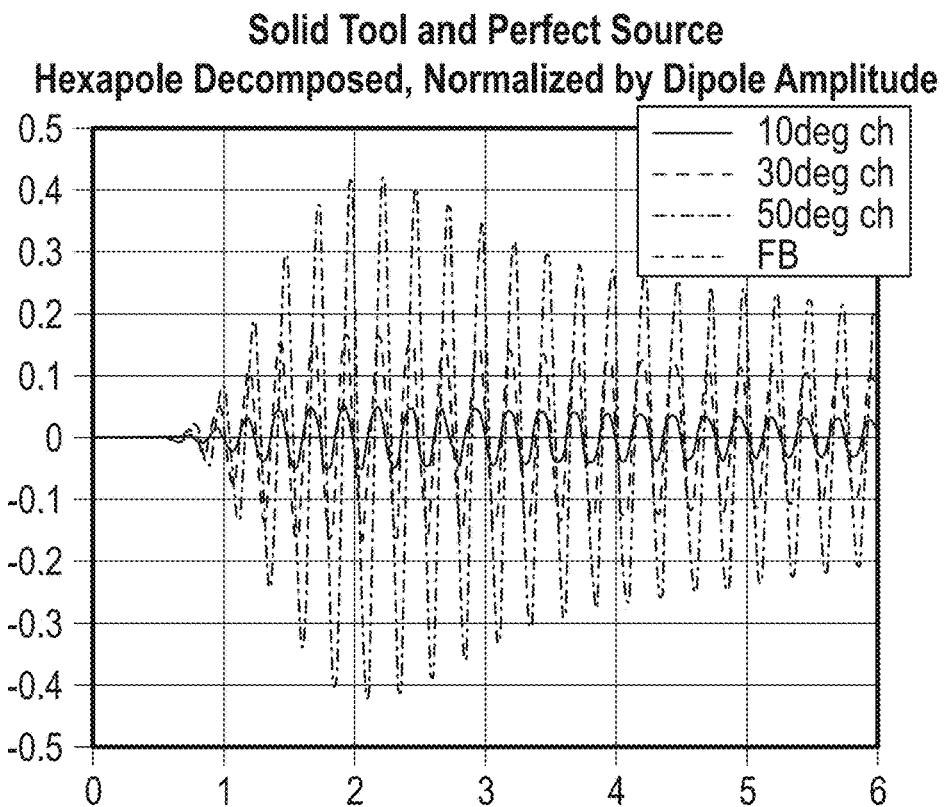
FIGS. 10A-B are graphs plotting the hexapole decomposed responses for four channel sizes calculated from a model with an ideal tool and source (FIG. 10A) and a model with an actual tool structure and a bender bar dipole source (FIG. 10B).
Figure 10B:
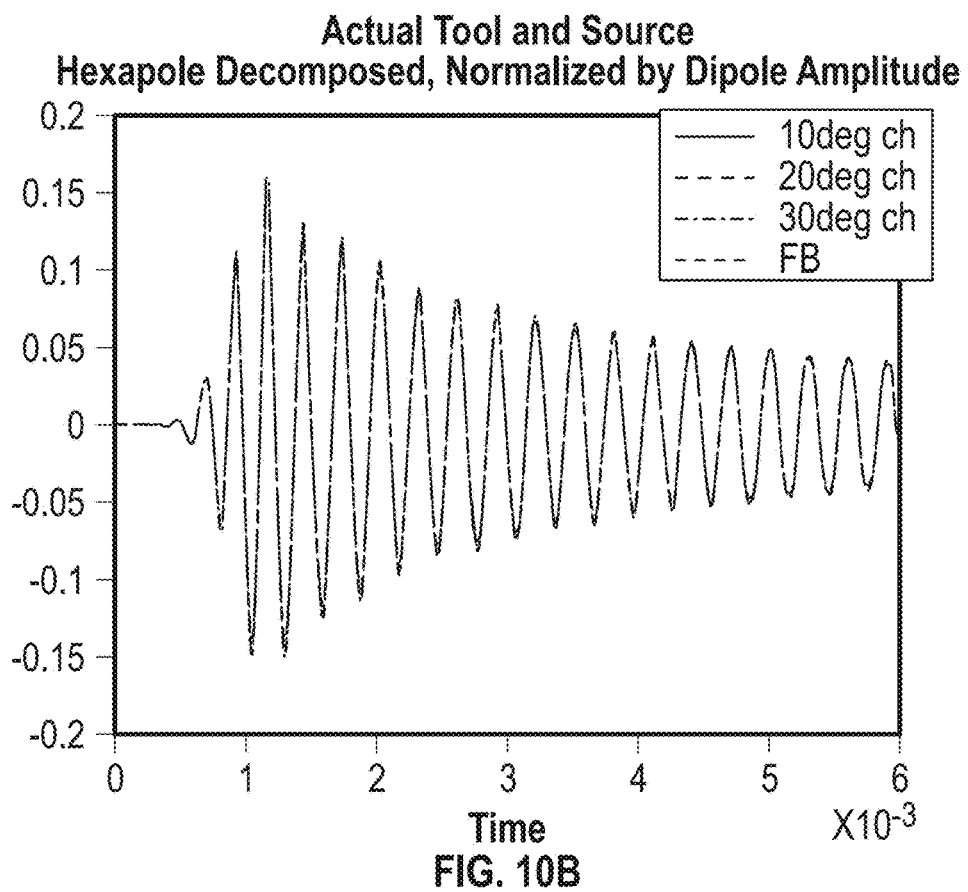

The simulation above was done with a solid cylindrical tool body and a perfect dipole source. In practicality, the tool body has features (e.g., different materials used in the tool such as rubber for seals that attenuate tool waves) and the source is not a perfect dipole. FIGS. 10A-B are graphs plotting the hexapole decomposed responses for four channel sizes calculated from a model with an ideal tool and source (FIG. 10A) and a model with an actual tool structure and a bender bar dipole source (FIG. 10B). It is observed that with an actual tool and source, the fully bonded (FB) case (dashed black line) contains relatively high hexapole mode energy. Further, the difference between the fully bonded case and those with channels are almost minimum. This is because the actual tool body and actual source contain intrinsic hexapole energy (or asymmetry), which is much more significant than the one caused by a channel.

Figures 11A, 11B, 11C:
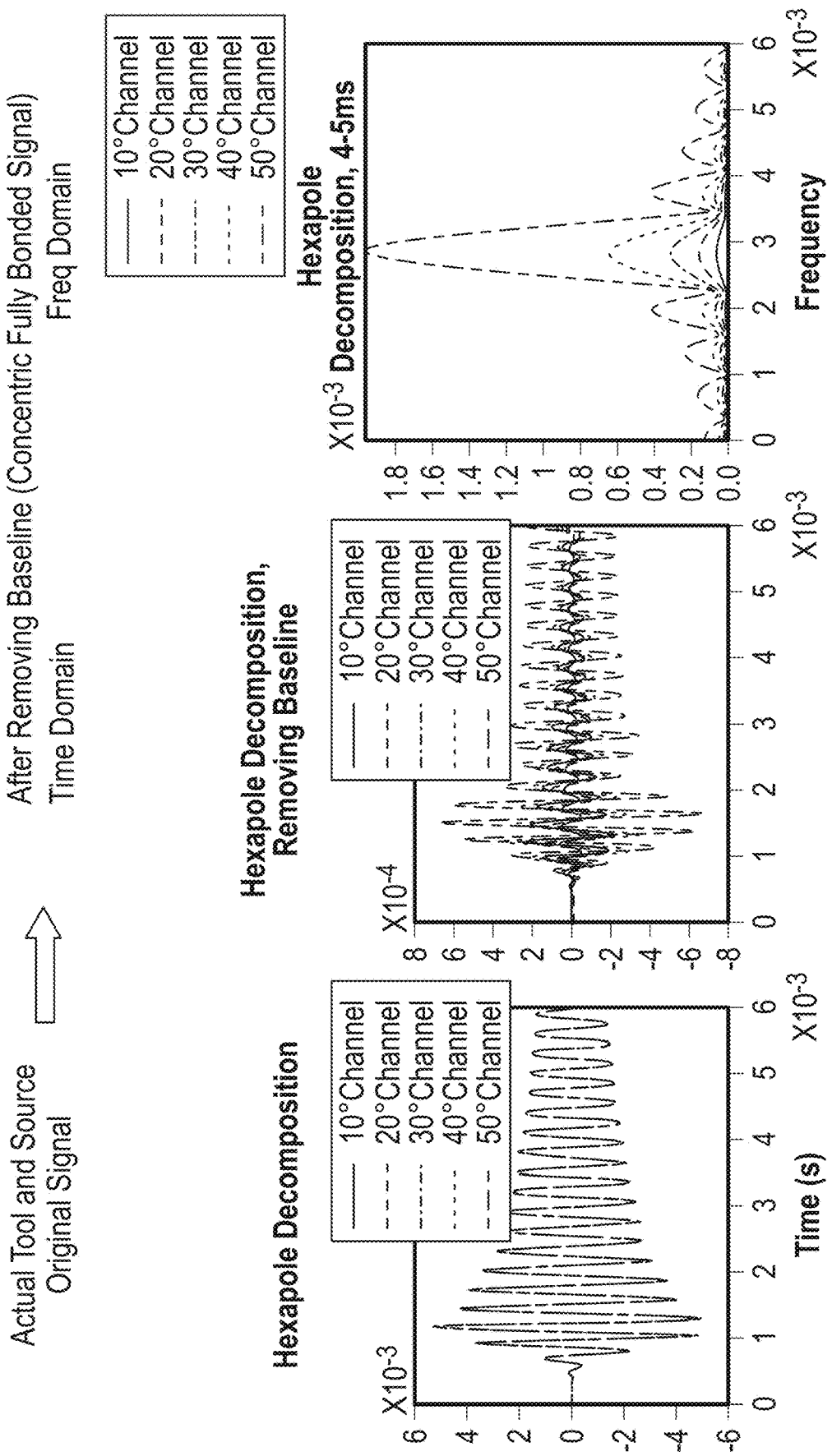

This problem can be reduced by a method shown in FIGS. 11A-C. FIG. 11A is a graph plotting the original signal from the actual tool and source. FIG. 11B shows the process signal after removal of the baseline signal in the time domain (showing a time segment), while FIG. 11C shows the same in the frequency domain. Thus, as shown here, a baseline signal measuring the intrinsic hexapole energy can be obtained from a fully bonded concentric case. The baseline signal can be subtracted from the original signal, and the remaining signal shows good sensitivity to the channel size, as shown in FIGS. 11B and 11C.

Figure 12:
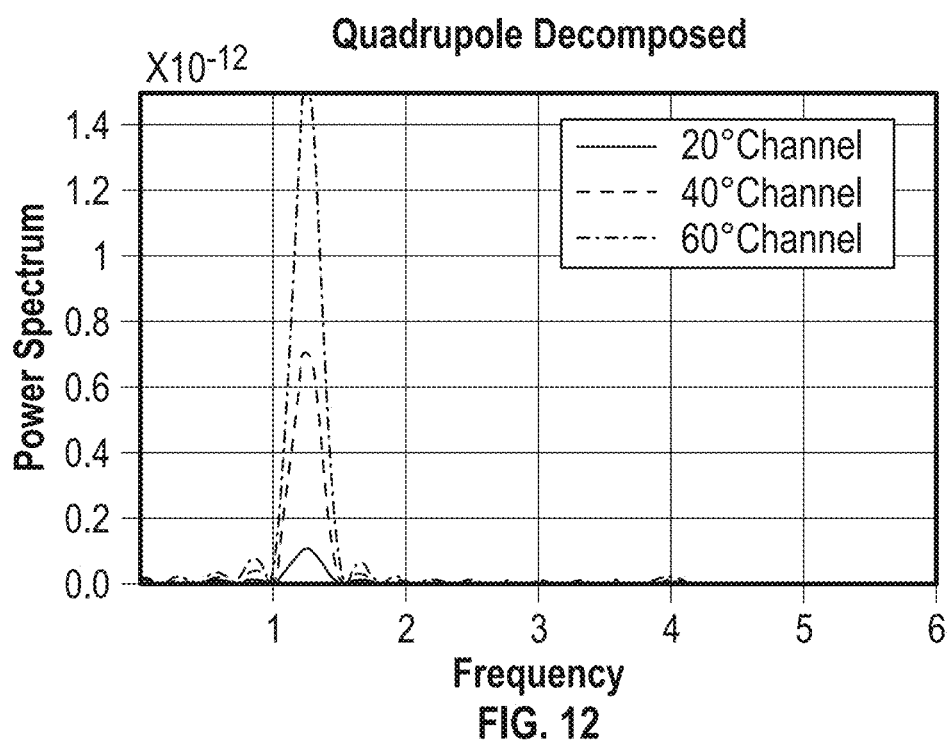
FIG. 12 shows an example of a monopole excited quadrupole mode.

The examples so far in this disclosure are based on a dipole converted hexapole mode, in which the dipole source excites a resonance dipole mode. FIG. 12 shows an example of a monopole excited quadrupole mode, in which there is no resonance monopole mode near this frequency. As can be seen, the response is sensitive to channel size but with a lower amplitude. FIG. 12 includes three channel sizes with 0% eccentricity.

Illustrative TTCE applications of the present disclosure will now be described. Some embodiments can be used in a downhole application to increase the measurement sensitivity of through tubing cement evaluation (TTCE) and acoustic signals at target points such as at or near a casing, a cement layer, and/or a casing/cement interface. However, example embodiments can be used any other types of application. For example, example embodiments can be used in Measurement While Drilling and wireline operations, which are further described below. An example application for TTCE is now described. In particular, FIGS. 13A and B depict an example sensor configuration that is part of a through tubing cement evaluation (TTCE) system, according to some embodiments.

Figure 13A:
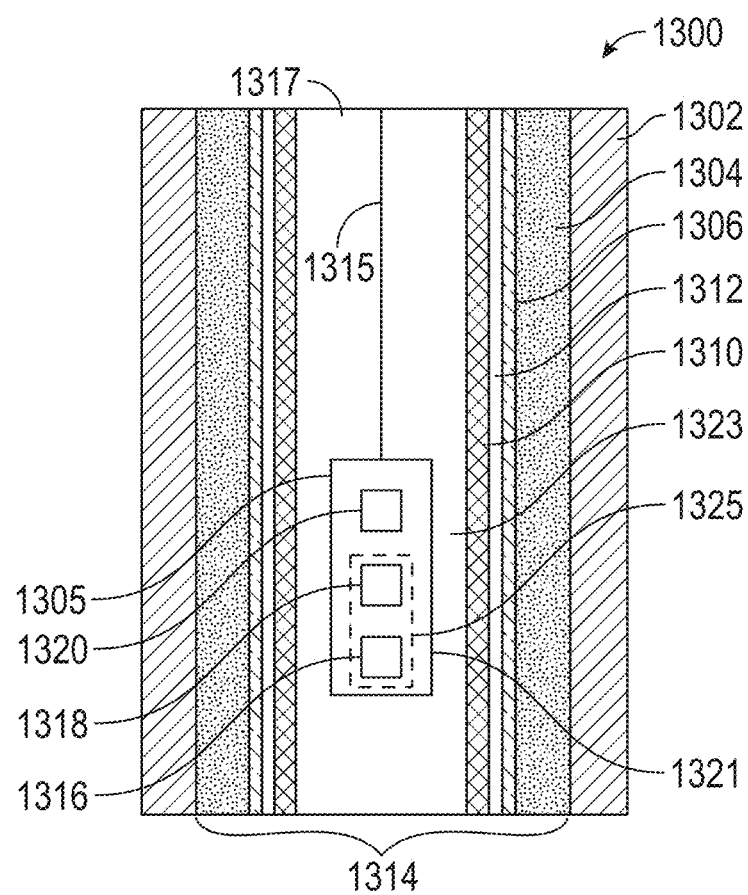
FIGS. 13A and B depict an example sensor configuration that is part of a through tubing cement evaluation system, according to some embodiments.
Figure 13B:
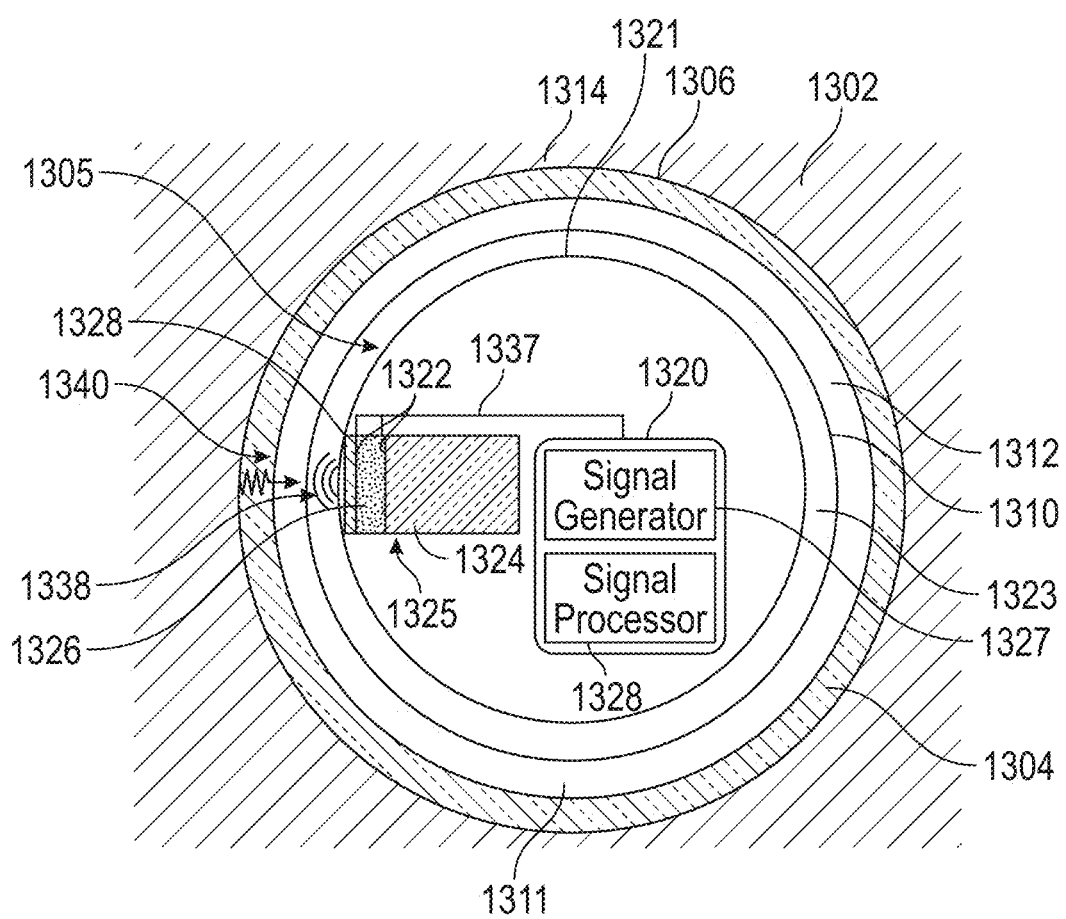

FIG. 13A depicts a side cross-sectional view of an example downhole tool having a transmitter and receiver array for through tubing cement evaluation, according to some embodiments. FIG. 13B depicts an overhead cross-sectional view of the example downhole tool of FIG. 13A, according to some embodiments.

As shown in FIGS. 13A and 13B (collectively, FIG. 13), an acoustic logging tool 1305 is deployed within a well that is defined by a wellbore 1314 in which a production tubing 1310 is installed within cement and metallic casing layers. The acoustic logging tool 1305 is generally configured to induce acoustic echo responses and process the responses to determine material and structural properties of multiple material layers within the wellbore 1314. For example, the echo responses may comprise reflected and/or refracted acoustic waves generated when acoustic signals transmitted from acoustic logging tool 1305 reflect and/or refract at acoustic impedance boundaries within and between the wellbore layers.

The wellbore 1314 is formed within a subsurface formation 102, such as may comprise a hydrocarbon formation in part, by drilling, and is typically filled with liquid and/or slurry substances such as water, reservoir fluids, etc. The outer perimeter of the wellbore 1314 can be sealed from the subsurface formation 102 by one or more barrier layers. For instance, a casing 1306 comprises a metallic tubular member forming an inner liner that seals the interior of the wellbore 1314. To securely position the casing 1306 with respect to the inner surface of the subsurface formation 1302, a cement layer 1304 is formed between the casing 1306 and the inner surface of the subsurface formation 1302 that bounds the wellbore 1314. The production tubing 1310 is installed within the cylindrical interior space of the casing 1306 to form an innermost production conduit 1317 and an annular space 1312 that typically forms an annular fluid layer between the outer surface of the production tubing 1310 and the inner surface of casing 1306.

The acoustic logging tool 1305 includes a tool housing 1321 within which an acoustic sensor/receiver array 1325 and a controller 1320 can be disposed. As shown in FIG. 13A, the acoustic sensor 1325 comprises an acoustic transmitter 1316 and an acoustic receiver 1318 within the tool housing 1321 within which the controller 1320 is also disposed. The acoustic transmitter 1316 can include one or more transmitters. Similarly, the acoustic receiver 1318 can include one or more receivers.

The acoustic logging tool 1305 is positioned within the innermost production conduit 1317 in the production tubing 1310 with an additional annular fluid layer 1323 formed in the annular space between the outer surface of the tool housing 1321 and the inner surface of the production tubing 1310. The acoustic sensor components are movably disposed within the fluid and along the length of the production conduit 1317 via a conveyance means 1315 such as may be a wireline or slickline. In some embodiments, the acoustic sensor 1325 may be configured with the acoustic transmitter 1316 and the acoustic receiver 1318 being individually contained and independently movable components. Alternatively, the acoustic sensor 1325 may be configured within a contiguous sensor housing such as depicted in FIG. 13 in which both the transmitter 1316 and the receiver 1318 are contained in a common tool housing 1321.

The acoustic logging tool 1305 comprises acoustic source/transmission components and acoustic detection and processing components within the acoustic sensor 1325. The transmitter and receiver components of the acoustic sensor 1325 are configured to measure acoustic responses, such as in the form of acoustic echoes, generated from acoustic source signals transmitted from the acoustic transmitter 1316 to various acoustic response target points within the wellbore 1314 and their converted modes. In the depicted embodiment of FIG. 13B, the acoustic sensor 1325 comprises a transmitter and/or receiver that are configured as piezoelectric transducers that are electrically, optically, or otherwise communicatively coupled to the controller 1320. The overhead representation in FIG. 13B of the acoustic sensor 1325 may represent either a transmitter and/or a receiver, which may be distinct, axially offset components as shown in FIG. 13A.

As shown in FIG. 13B, the acoustic sensor 1325 can include a transducer comprising a piezoelectric material layer 1326 and a pair of electrodes 1322 coupled to a front side and a back side of the piezoelectric material layer 1326. An electrical or optical communication interface 1337 can provide electrical contact and connectivity between the acoustic sensor 1325 and controller 1320. The acoustic sensor 1325 can further include a backing material layer 1324 disposed behind the piezoelectric material layer 1326. The backing material layer 1324 can include acoustic attenuation material such as ultrasonic attenuation material that is compositionally and structurally configured to attenuate acoustic waves emitted from the back side of the primary transducer. The acoustic sensor 1325 can further include a protective cover layer 1329 coupled to the radially outward front side of the transducer. The cover layer 1329 can form a fluid impermeable seal preventing fluids from contacting the internal components of the acoustic sensor 1325. To minimize front side external acoustic reflection during signal transmission and internal acoustic reflection during reception of acoustic echoes, the cover layer 1329 may comprise a material having an acoustic impedance matching the acoustic impedance of the external acoustic medium, such as fluids within production conduit 1317.

The controller 1320 may be a programmable electronic module that is communicatively coupled to the piezoelectric transducer(s) of the transmitter/receiver components within the acoustic sensor 1325. The controller 1320 is configured, using electronics and program code instructions, to provide excitation pulse signals to the transducer electrodes during pulse transmit periods that may comprise the excitation phase of measurement cycles. The controller 1320 can include a signal generator 1327 and a signal processor 1328. The signal generator 1327 is configured using any combination of hardware and/or program code constructs to generate and send excitation pulse signals to the electrodes 1322 via the communication interface 1337 that may include one or more electrical conduction paths. The signal processor 1328 is configured using any combination of hardware and/or program code constructs to detect/measure echo response signals received from receiver transducer electrodes via the communication interface 1337.

The signal generator 1327 can generate pulse signals comprising alternating current signals and corresponding voltage fluctuations that are applied to the transducer electrodes, resulting in fluctuating electrical fields and corresponding fluctuating electrical charges applied across the piezoelectric layer of the transducer within the acoustic transmitter 1316. Piezoelectric effect results in changes to mechanical stress and consequent mechanical deformation of the piezoelectric material layers. The mechanical deformation corresponds in terms of frequency and amplitude to the frequency and amplitude of the received electrical excitations signals, resulting in an ultrasonic vibration of the piezoelectric layer. The ultrasonic vibration of the piezoelectric layer mechanically induces corresponding ultrasonic pressure waves within and across the wellbore 1314. The acoustic pressure waves generated by the transmitter transducer, such as the sensor pulse 1338, propagate through a wellbore annulus 1311 that includes all of the material layers and layer boundaries within the wellbore 1314. The sensor pulse 1338 induces a corresponding acoustic echo signal 1340 that results from reflection and/or refraction from various downhole acoustic boundaries within and at the boundaries between the various material layers within the wellbore 1314 (which includes the converted modes).

Sensor pulses, such as the sensor pulse 1338, can be generated periodically, intermittently, or otherwise as part of individual measurement cycles. Each measurement cycle can begin with an excitation phase during which the signal generator 1327 applies an electrical excitation that induces corresponding acoustic pulses in the transmitter transducer(s) to which the excitation is applied. Each measurement cycle can further include an echo response phase such as may be defined and implemented by the signal processor components 1328. During the echo response phase of each measurement cycle, signal processor components can detect and process acoustic echo response signals such as the signal 1340 that are transduced by a receiver transducer from acoustic waves to an electrical acoustic response signal.

TTCE analysis can include acoustic response information that is location-specific (e.g., along the cylindrical boundary between the cement layer 1304 and the casing 1306) as well as properties specific (e.g., density, structural characteristics). The multiple different material layers that may present acoustic barriers (reflectors and sinks) and varying ambient environmental conditions may present interference for or otherwise reduce accuracy of the acoustic measurements and particularly acoustic measurements for which the target response locations are outside of one or more of the wellbore tubulars such as the production tubing 1310 and the casing 1306. The apparatus 1300 is configured to collect and process acoustic response information in a manner that removes interference such as extraneous acoustic response information and sensor variations to enable more accurate representation of target acoustic response information. The acoustic measurement components of the apparatus 1300 are configured to implement efficient and accurate acoustic measurements of wellbore material properties with reduced reliance on removing internal acoustic barriers such as production tubing, as described herein.

In some embodiments, the apparatus 1300 is configured to collect acoustic measurement information that uses differential processing of acoustic responses to more precisely isolate intended acoustic response information such as cement bond response information. As further described herein, the acoustic transmitter 1316 can include an azimuthally directional transmitter such as a dipole transmitter that emits acoustic pulses. Also, as further described below, the acoustic receiver 1318 can be a multi-receiver array. For example, the acoustic receiver 1318 can be an array of two or more azimuthal receivers.

The target points for acoustic measurements by the directional acoustic transmitter/receiver pair may be included along one or more circumferential boundaries at various radial distances from the center of the wellbore 1314. In the depicted embodiment, primary target points may be included in the cylindrical contact interface between the cement layer 1304 and the outer metallic surface of the casing 1306. Target points may also be included between the inner and outer surfaces of the cement layer 1304 and or within other material layers or material boundaries within the wellbore 1314. For example, target points may be included at the liquid/metal boundary between the annular fluid layer 1312 and the casing 1306 to test casing material properties such as calcium or other mineral buildup on the casing surface. All or most target points are located outside of the production tubing 1310 and some of the most important, such as cement-to-casing bond target points, are located outside of both the production tubing 1310 and the casing 1306.

Figure 14:
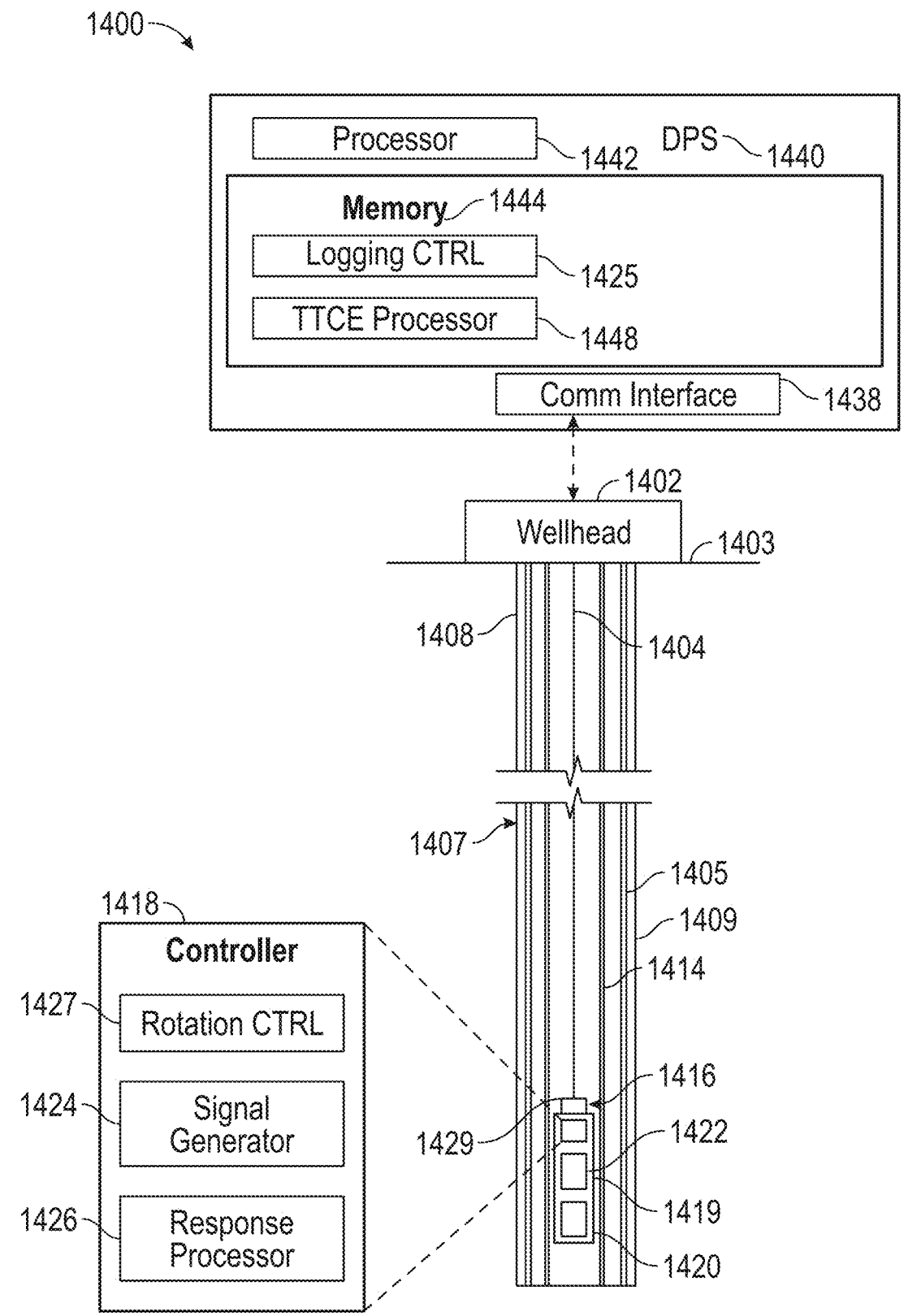
FIG. 14 depicts an example system that is configured to implement through tubing cement evaluation, according to some embodiments.

FIG. 14 depicts an example system that is configured to implement through tubing cement evaluation (TTCE), according to some embodiments. In FIG. 14, a well system 1400 is particularly configured to address issues posed by TTCE, which entails measuring acoustic responses, such as acoustic echoes, generated by acoustic source signals that originate within an innermost tubing within a wellbore. The well system 1400 includes subsystems, devices, and components configured to implement acoustic measurement testing methods as described herein within a substantially cylindrical wellbore volume 1407 that in the depicted embodiment is bounded and sealed by a casing 1405. A cement layer 1409 between the casing 1405 and an inner borehole wall 1408 provides a protective seal that maintains structural and positional stability of the casing 1405. The well system 1400 includes a wellhead 1402 configured to deploy drilling and production and/or injection equipment such as drilling strings, production strings, etc. As shown, an interior tubing 1414 is deployed within the wellbore volume 1407 and may comprise production tubing, drilling tubing such as drill pipes, injection tubing, or other type of tubing.

The wellhead 1402 includes components for configuring and controlling deployment in terms of insertion and withdrawal of a test string within the wellbore volume 1407. The test string may be configured as a wireline test string deployed within the interior tubing 1414 and having a wireline cable 1404 for moving and providing communication and power source connectivity for downhole test tools. In the depicted embodiment, the wireline cable 1404 is configured as the conveyance means for a logging tool 1416 that includes an acoustic transmitter 1420 and an acoustic receiver 1422 disposed within a tool housing 1419. Communication and power source couplings are provided to the acoustic transmitter 1420 and the acoustic receiver 1422 via the wireline cable 1404 having one or more communication and power terminals within the wellhead 1402.

The acoustic transmitter 1420 and the acoustic receiver 1422 comprise components, including components not expressly depicted, configured to implement acoustic measurement testing including TTCE testing. The acoustic transmitter 1420 may be configured as an acoustic transducer as depicted in FIG. 13B that transmits acoustic pulses in an azimuthally directional manner.

The acoustic receiver 1422 may comprise an array of azimuthal receivers with two or more receivers. The logging tool 1416 further includes a controller 1418 comprising components including a signal generator 1424 and a response processor 1426 for controlling acoustic measurement operation. The signal generator 1424 is configured to generate electrical signals that are converted by the acoustic transmitter 1420 into acoustic waves emitted within the wellbore 1407. The response processor 1426 is configured to measure acoustic responses by processing the converted acoustic wave information from the acoustic receiver 1422.

The logging tool 1416 is coupled via a telemetry link within the wireline cable 1404 to a data processing system (DPS) 1440. The DPS 1440 includes a communication interface 1438 configured to transmit and receive signals to and from the logging tool 1416 as well as other devices within well system 1400 using a communication channel with the wireline cable 1404 as well as other telemetry links such as wireless electromagnetic links, acoustic links, etc. The DPS 1440 may be implemented in any of one or more of a variety of standalone or networked computer processing environments. As shown, the DPS 1440 may operate above a terrain surface 1403 within or proximate to the wellhead 1402, for example. The DPS 1440 includes processing, memory, and storage components configured to receive and process acoustic measurement information to determine material and structural properties and conditions within and/or external to the cylindrical volume defined by the borehole wall 1408. The DPS 1440 is configured to receive acoustic response data from the logging tool 1416 as well as from other sources such as surface test facilities. The acoustic data received from the logging tool 1416 includes echo response signals detected by the acoustic receiver 1422. The DPS 1440 comprises, in part, a computer processor 1442 and a memory 1444 configured to execute program instructions for controlling measurement cycles and processing the resultant echo response signals to determine wellbore material properties. Such properties and structural attributes may include but are not limited to cement structural integrity and the state of adhesion of the bonding between the cement layer 1409 and the casing 1405.

The DPS 1440 includes program components including a TTCE processor 1448 and a logging controller 1450. The TTCE processor 1448 includes program components and data configured to process acoustic response data received from the logging tool 1416. The logging controller 1450 includes program components and data configured to coordinate and otherwise control positioning and repositioning of the logging tool 1416 within and along the length of the interior tubing 1414, as well as the acoustic measurement procedures at each position. Loaded from the memory 1444, the TTCE processor 1448 is configured to execute program instructions to receive and process acoustic response data such as the logging data 1430.

The components within the DPS 1440 and the test string interoperate to implement acoustic measurement collection and processing in a manner enabling optimal accuracy of through tubing material evaluation. A next acoustic measurement cycle may begin with positioning of the logging tool 1416 at a next axial location along the length of interior tubing 1414. At the next axial location, the logging tool 1416 can rotationally positioned to an initial specified azimuthal angle. In the depicted embodiment, the logging tool 1416 may be rotated via controlled actuation of a DC motor 1429. For example, a rotation controller 1427 may be incorporated within the controller 1418 and be configured to azimuthally position the logging tool 1416, and more specifically the transmitter/receiver within the logging tool 1416, to a specified initial measurement azimuth angle.

The measurement cycle may continue with the logging tool 1416 measuring an acoustic response at the initial azimuthal angle. For TTCE logging, the overall acoustic response includes an echo response window in which echo signal characteristics profile material and structural characteristics of the cement-to-casing bonding at the azimuth angle. Following the initial azimuth measurement, the logging tool 1416 is rotated to a next azimuth at which a next azimuthally specific acoustic response is measured and otherwise collected, and the process is repeated at other azimuthal angles along a full 360° azimuthal path. The azimuthal angles at which the measurements are performed are selected to result in measurement pairs that are substantially azimuthally offset (e.g., one measurement is separated by at least 90° from the other measurement in the pair). In some embodiments, the measurement angles are selected to result in measurement pairs that are substantially azimuthally opposed (e.g., separated by approximately 180° within a range of 10°). It should be noted that the measurements at each point may be nearly instantaneous due to the proximity of the cement layer target points such that the rotation of the logging tool 1416 between measurements may be intermittent or continuous.

Figure 15:
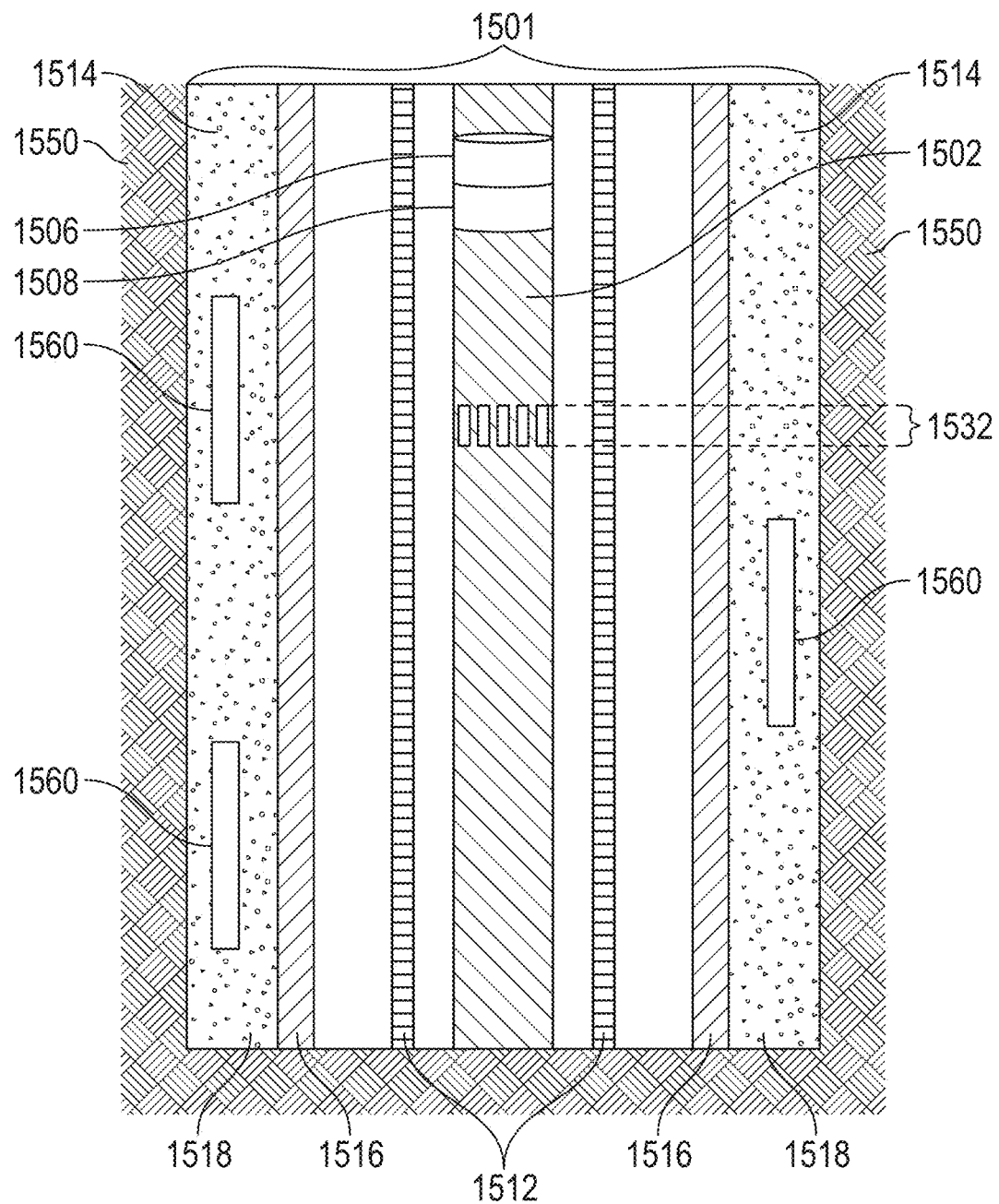
FIG. 15 depicts a first example transmitter-receiver configuration having a cross dipole transmitter and azimuthal receiver array for performing TTCE.

Example transmitter-receiver configurations are now described. Two example configurations are now described. Both configurations can be arranged to generate a multipole emissions from different azimuthal positions. FIG. 15 depicts a first example transmitter-receiver configuration having a cross dipole transmitter and azimuthal receiver array for performing TTCE, according to some embodiments. FIG. 15 depicts a wellbore 1501 formed in a subsurface formation 1550. The wellbore 1501 has been cased (with a casing 1516) such that an annulus 1514 has been defined between a wall of the wellbore 1501 and the casing 1516. A cement 1518 has been poured into the annulus 1514. In this example, the cement 1518 includes three channels 1560. Thus, these portions of the cement 1518 are partially (not fully) bonded. As further described below, example embodiments can evaluate the cement to determine varying bonding conditions of the cement.

A production tubing 1512 has been positioned down the wellbore 1501 within the casing 1516. A downhole tool 1502 is positioned within the production tubing 1512. In this example, the downhole tool 1502 includes a cross dipole transmitter that includes an X dipole transmitter 1506 and a Y dipole transmitter 1508. The X dipole transmitter 1506 and the Y dipole transmitter 1508 can emit in directions that are orthogonal to each other. In some implementations, the cross dipole transmitter can be replaced with a single dipole transmitter such that the transmitter can rotate to emit from the two orthogonal directions.

Additionally, a receiver array 1532 is positioned at a different longitudinal position as compared to the cross dipole transmitter. In this example, the receiver array 1532 includes a number of receivers are at different azimuthal positions circumferentially around the downhole tool 1502. In some implementations, the receiver array 1532 can be replaced with an X dipole receiver and a Y dipole receiver to receive the dipole response being emitted from the cross dipole transmitter. In operation, the transmitter(s) can emit acoustic waves that interact with the wellbore structure (including the production tubing 1512, the casing 1516, wellbore fluid, and the downhole tool 1502 itself). The returned acoustic wave can be detected by the receiver array 1532.

Figure 16:
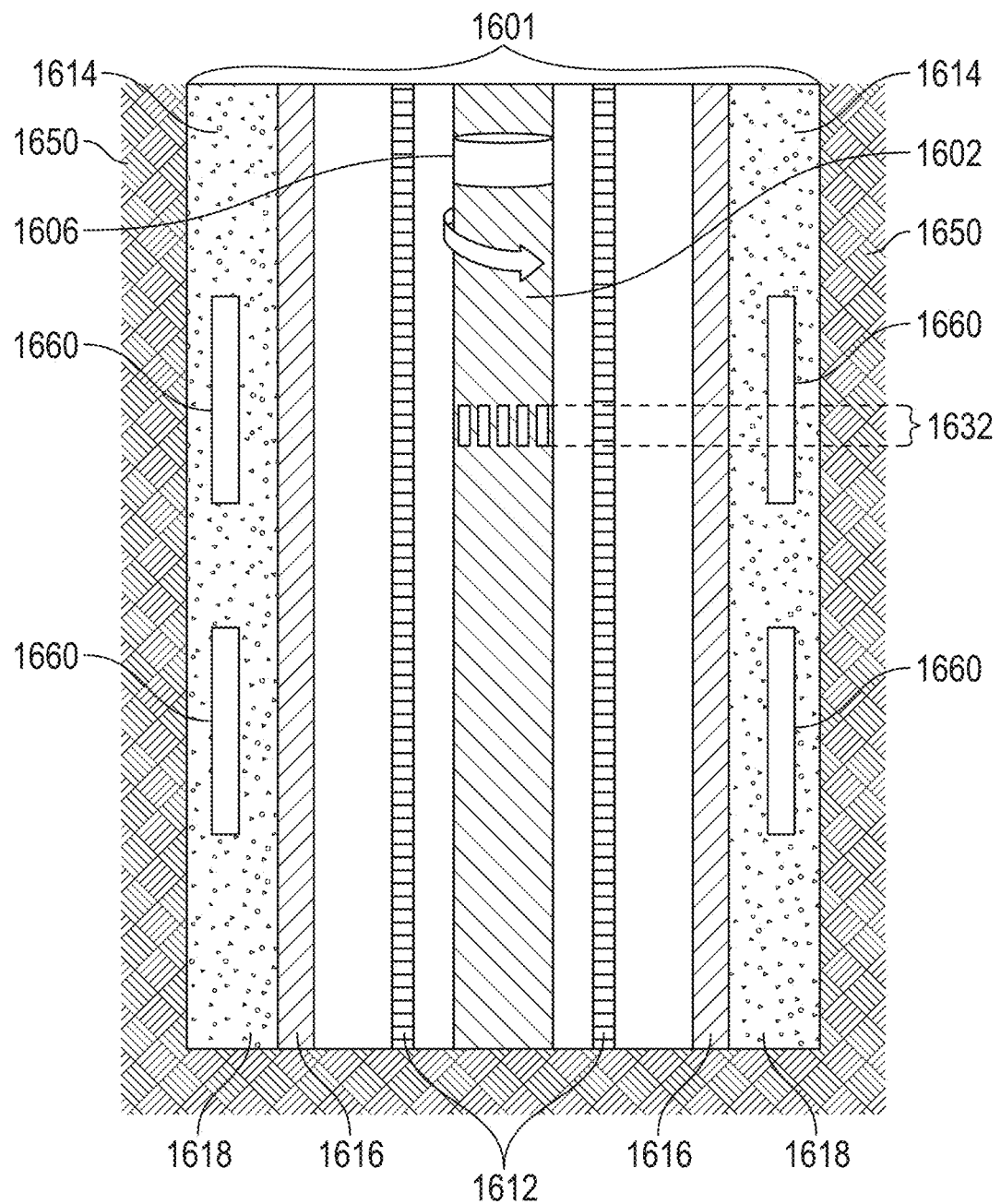
FIG. 16 depicts a second example transmitter-receiver configuration having a rotatable transmitter and azimuthal receiver array for performing TTCE, according to some embodiments.

FIG. 16 depicts a second example transmitter-receiver configuration having a rotatable transmitter and azimuthal receiver array for performing TTCE, according to some embodiments. FIG. 16 depicts a wellbore 1601 formed in a subsurface formation 1650. The wellbore 1601 has been cased (with a casing 1616) such that an annulus 1614 has been defined between a wall of the wellbore 1601 and the casing 1616. A cement 1618 has been poured into the annulus 1614. In this example, the cement 1618 includes four channels 1660. Thus, these portions of the cement 1618 are partially (not fully) bonded. As further described below, example embodiments can evaluate the cement to determine varying bonding conditions of the cement.

A production tubing 1612 has been positioned down the wellbore 1601 within the casing 1616. A downhole tool 1602 is positioned within the production tubing 1612. In this example, the downhole tool 1602 includes a rotatable transmitter 1606. The rotatable transmitter 1606 can rotate for emission in different azimuthal directions. In some implementations, the rotatable transmitter 1606 can be a unipole, dipole, or higher order pole. The rotatable transmitter 1606 can emit acoustic transmissions at different azimuthal directions such that there is at least one rotation. The dipole component along any direction can be computed by summing the dipole response of each of the emissions at the specific direction.

Additionally, a receiver array 1632 is positioned at a different longitudinal position as compared to the rotatable transmitter 1606. In this example, the receiver array 1632 includes a number of receivers are at different azimuthal positions circumferentially around the downhole tool 1602. In some implementations, the receiver array 1632 can be replaced with an X dipole receiver and a Y dipole receiver to receive the dipole response being emitted from the rotatable transmitter 1606. Also, the receiver array or receivers can be mounted on a fixed or rotatable section of the downhole tool 1602. In operation, the rotatable transmitter 1606 can emit acoustic waves that interact with the wellbore structure (including the production tubing 1612, the casing 1616, wellbore fluid, and the downhole tool 1602 itself). The returned acoustic wave can be detected by the receiver array 1632.

FIG. 17 is a flow chart of a method, according to illustrative embodiments of the present disclosure. In this example, a downhole logging tool has been deployed inside a cased wellbore formed in a subsurface formation. At block 1702 of method 1700, a first acoustic transmission is emitted which penetrates the tubing, casing and cement. At block 1704, a receiver array is used to detect a first acoustic response of the first acoustic transmission. At block 1706, the logging system determines the multimode wellbore resonance of the first acoustic response. Meanwhile, in response to the first acoustic transmission penetrating the cement, the mode of the multimode resonance is converted into a second mode which is different from the original mode of the transmitted signal. At block 1708, the receiver detects a second acoustic response derived from the converted mode of the multimode wellbore resonance. At block 1710, the converted mode is then determined based on the second acoustic response. At block 1712, the logging system the determines and evaluates the cement property (e.g., bonding) based on the multimode wellbore resonance and the converted mode. Further, using the method described herein, the system can also determine the degree of partial bonding (e.g., the % bonding). In response to the method 1700 above, any number of remedial actions can be performed to correct the bonding condition (e.g., repairing the bonding condition, shutting in the well, etc.).

Figure 18:
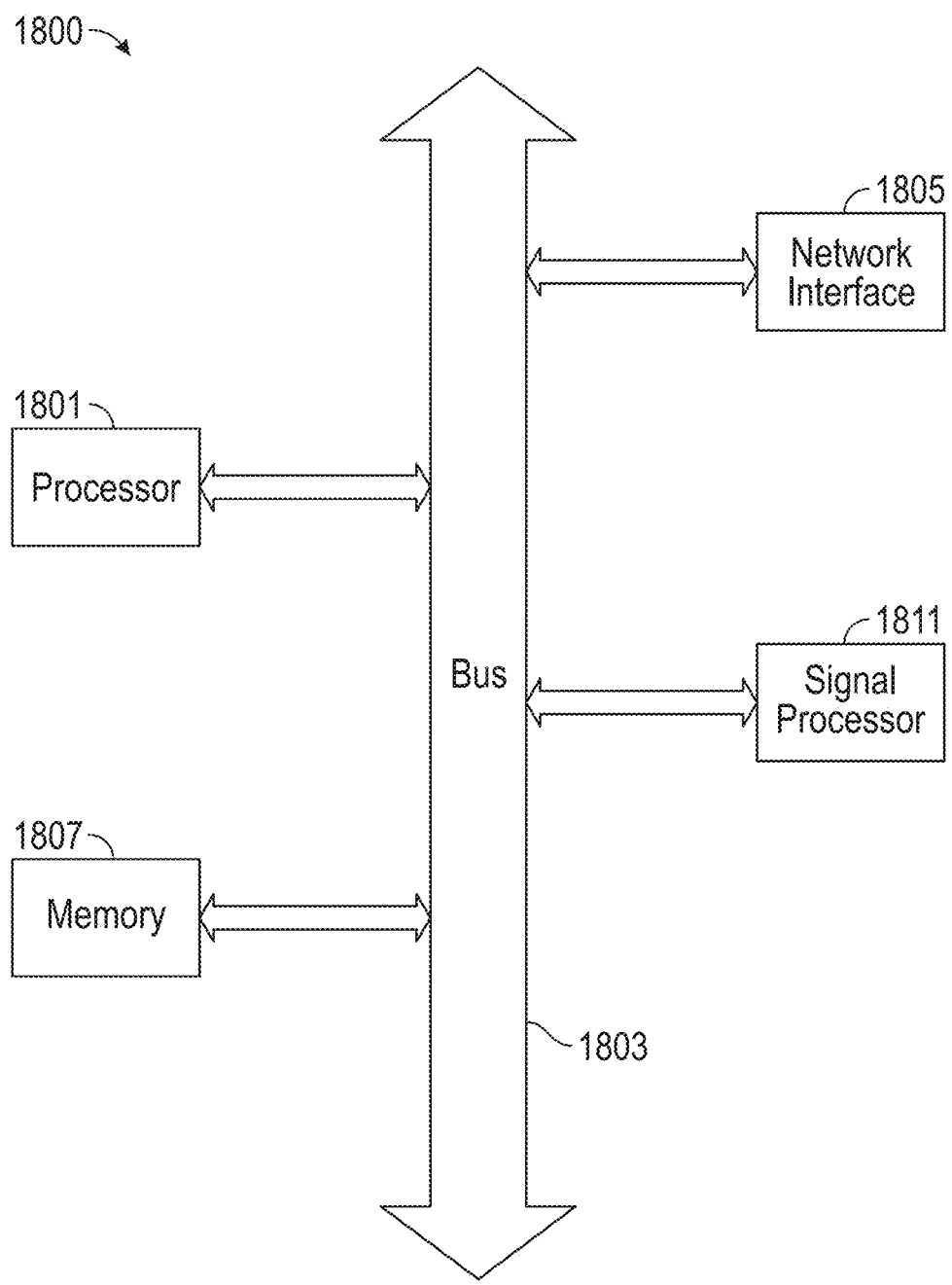
FIG. 18 depicts an example computer, according to some embodiments.

FIG. 18 depicts an example computer, according to some embodiments. A computer 1800 system includes a processor 1801 (possibly including multiple processors, multiple cores, multiple nodes, and/or implementing multi-threading, etc.). The computer 1800 includes a memory 1807. The memory 1807 may be system memory or any one or more of the above already described possible realizations of machine-readable media. The computer 1800 also includes a bus 1803 and a network interface 1805. The computer 1800 can communicate via transmissions to and/or from remote devices via the network interface 1805 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 1800 also includes a signal processor 1811 that can perform at least some of the operations described herein. Any one of the previously described functionalities may be partially (or entirely) implemented in hardware and/or on the processor 1801. For example, the functionality may be implemented with an application specific integrated circuit, in logic implemented in the processor 1801, in a co-processor on a peripheral device or card, etc. Further, realizations may include fewer or additional components not illustrated in FIG. 18 (e.g., video cards, audio cards, additional network interfaces, peripheral devices, etc.). The processor 1801 and the network interface 1805 are coupled to the bus 1803. Although illustrated as being coupled to the bus 1803, the memory 1807 may be coupled to the processor 1801.

While the aspects of the disclosure are described with reference to various implementations and exploitations, it will be understood that these aspects are illustrative and that the scope of the claims is not limited to them. In general, techniques for cement bonding condition evaluation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As described herein, the illustrative methods use a converted multipole resonance mode to detect fluid channel outside a cemented casing. In some cases, exciting a coupled resonance mode at the same frequency band generate a converted mode with enhanced amplitude. The signals from azimuthal receivers can be decomposed to enhance a specific multipole mode. The intrinsic multipole mode caused by the tool or source can be removed to improve the channel detection sensitivity. The proposed methods are able to detect channels smaller than, for example, 50°, hence increases the confidence of detecting a fully bonded section.

Methods and embodiments described herein further relate to any one or more of the following paragraphs:

1. A computer-implemented method, comprising: conveying a downhole tool in a tubing that is positioned in a casing that is positioned to form an annulus between the casing and a wall of a wellbore formed in a subsurface formation, wherein a cement with unknown bonding condition exists in the annulus, wherein the downhole tool includes at least one transmitter configured to emit an acoustic transmission at different azimuthal positions, and wherein the downhole tool includes a receiver array that includes at least two receivers physically positioned in different azimuthal directions; emitting, from the at least one transmitter, a first acoustic transmission and outward to the cement such that at least a portion of the first acoustic transmission penetrates the cement; detecting, by the receiver array, a first acoustic response that is derived from the first acoustic transmission; determining a multimode wellbore resonance based on the first acoustic response, wherein, in response to the first acoustic transmission penetrating the cement, a first mode of the multimode wellbore resonance is converted into a second mode different from the first mode; detecting, by the receiver array, a second acoustic response derived from the converted mode of the multimode wellbore resonance; determining the converted mode based on the second acoustic response; and evaluating a property of the cement based on the multimode wellbore resonance and the converted mode;

2. The method of paragraph 1, wherein a frequency of the multimode wellbore resonance corresponds to a dimension and material property of the wellbore;

3. The method of paragraph 1 or 2, wherein an amplitude of the converted mode corresponds to a size of a fluid channel in the cement;

4. The method of any of paragraphs 1-3, further comprising: generating a decomposed response based on the first acoustic response and the second acoustic response, wherein determining the converted mode comprises: selecting at least one of a time segment or a frequency range of decomposed response based on an azimuthal direction where the channel is located in the cement; and evaluating the property of the cement based on the selected at least one of the time segment or the frequency range;

5. The method f any of paragraphs 1-4, further comprising: determining an eccentricity of the tubing that defines an offset of a position of the tubing from the center of the wellbore, wherein determining the converted mode comprises determining the converted mode based on the eccentricity;

6. The method of any of paragraphs 1-5, wherein evaluating the property of the cement comprises evaluating a bonding condition of the cement;

7. The method of any of paragraphs 1-6, wherein evaluating the bonding condition of the cement comprises determining whether the bonding condition is at least one of a fully bonded condition, a free pipe condition, and a partially bonded condition;

8. The method of any of paragraphs 1-8, further comprising performing a remedial action to correct a fault in the cement based on the evaluating the property of the cement;

9. A system comprising: a processor; and a memory coupled to the process having instructions stored therein, which, when executed by the processor, causes the process to perform a plurality of functions, including functions to: emit, from at least one transmitter of a downhole tool positioned along a wellbore having a cement bond, a first acoustic transmission and outward to the cement such that at least a portion of the first acoustic transmission penetrates the cement; detect, by a receiver array of the downhole tool, a first acoustic response that is derived from the first acoustic transmission; determine a multimode wellbore resonance based on the first acoustic response, wherein, in response to the first acoustic transmission penetrating the cement, a first mode of the multimode wellbore resonance is converted into a second mode different from the first mode; detect, by the receiver array, a second acoustic response derived from the converted mode of the multimode wellbore resonance; determine the converted mode based on the second acoustic response; and evaluate a property of the cement based on the multimode wellbore resonance and the converted mode;

10. The system of paragraph 9, wherein a frequency of the multimode wellbore resonance corresponds to a dimension and material property of the wellbore;

11. The system of paragraphs 9 or 10, wherein an amplitude of the converted mode corresponds to a size of a fluid channel in the cement;

12. The system of any of paragraphs 9-11, wherein the functions further comprise: generating a decomposed response based on the first acoustic response and the second acoustic response, wherein determining the converted mode comprises: selecting at least one of a time segment or a frequency range of decomposed response based on an azimuthal direction where the channel is located in the cement; and evaluating the property of the cement based on the selected at least one of the time segment or the frequency range;

13. The system of any of paragraphs 9-12, further comprising: determining an eccentricity of the tubing that defines an offset of a position of the tubing from the center of the wellbore, wherein determining the converted mode comprises determining the converted mode based on the eccentricity;

14. The system of any of paragraphs 9-13, wherein evaluating the property of the cement comprises evaluating a bonding condition of the cement;

15. The system of any of paragraphs 9-14, wherein evaluating the bonding condition of the cement comprises determining whether the bonding condition is at least one of a fully bonded condition, a free pipe condition, and a partially bonded condition.

Moreover, the methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method, comprising:
   conveying a downhole tool in a tubing that is positioned in a casing that is positioned to form an annulus between the casing and a wall of a wellbore formed in a subsurface formation, wherein a cement with unknown bonding condition exists in the annulus, wherein the downhole tool includes at least one transmitter configured to emit an acoustic transmission at different azimuthal positions, and wherein the downhole tool includes a receiver array that includes at least two receivers physically positioned in different azimuthal directions;
   emitting, from the at least one transmitter, a first acoustic transmission and outward to the cement such that at least a portion of the first acoustic transmission penetrates the cement;
   detecting, by the receiver array, a first acoustic response that is derived from the first acoustic transmission;
   determining a multimode wellbore resonance based on the first acoustic response,
   wherein, in response to the first acoustic transmission penetrating the cement, a first mode of the multimode wellbore resonance is converted into a second mode different from the first mode;
   detecting, by the receiver array, a second acoustic response derived from the converted mode of the multimode wellbore resonance;
   determining the converted mode based on the second acoustic response, wherein the second acoustic response is a first mode and the converted mode is a second mode; and
   evaluating a property of the cement based on the multimode wellbore resonance and the converted mode.

2. The method of claim 1, wherein a frequency of the multimode wellbore resonance corresponds to a dimension and material property of the wellbore.

3. The method of claim 1, wherein an amplitude of the converted mode corresponds to a size of a fluid channel in the cement.

4. The method of claim 1, further comprising:
   generating a decomposed response based on the first acoustic response and the second acoustic response, wherein determining the converted mode comprises:
   selecting at least one of a time segment or a frequency range of decomposed response based on an azimuthal direction where the channel is located in the cement; and
   evaluating the property of the cement based on the selected at least one of the time segment or the frequency range.

5. The method of claim 1, further comprising:
   determining an eccentricity of the tubing that defines an offset of a position of the tubing from the center of the wellbore,
   wherein determining the converted mode comprises determining the converted mode based on the eccentricity.

6. The method of claim 1, wherein evaluating the property of the cement comprises evaluating a bonding condition of the cement.

7. The method of claim 6, wherein evaluating the bonding condition of the cement comprises determining whether the bonding condition is at least one of a fully bonded condition, a free pipe condition, and a partially bonded condition.

8. The method of claim 1, further comprising performing a remedial action to correct a fault in the cement based on the evaluating the property of the cement.

9. A system comprising:
   a processor; and
   a memory coupled to the process having instructions stored therein, which, when executed by the processor, causes the process to perform a plurality of functions, including functions to:
   emit, from at least one transmitter of a downhole tool positioned along a wellbore having a cement bond, a first acoustic transmission and outward to the cement such that at least a portion of the first acoustic transmission penetrates the cement;
   detect, by a receiver array of the downhole tool, a first acoustic response that is derived from the first acoustic transmission;
   determine a multimode wellbore resonance based on the first acoustic response,
   wherein, in response to the first acoustic transmission penetrating the cement, a first mode of the multimode wellbore resonance is converted into a second mode different from the first mode;
   detect, by the receiver array, a second acoustic response derived from the converted mode of the multimode wellbore resonance;
   determine the converted mode based on the second acoustic response, wherein the second acoustic response is a first mode and the converted mode is a second mode; and evaluate a property of the cement based on the multimode wellbore resonance and the converted mode.

10. The system of claim 9, wherein a frequency of the multimode wellbore resonance corresponds to a dimension and material property of the wellbore.

11. The system of claim 9, wherein an amplitude of the converted mode corresponds to a size of a fluid channel in the cement.

12. The system of claim 9, wherein the functions further comprise:
generating a decomposed response based on the first acoustic response and the second acoustic response,
wherein determining the converted mode comprises:
selecting at least one of a time segment or a frequency range of decomposed response based on an azimuthal direction where the channel is located in the cement; and
evaluating the property of the cement based on the selected at least one of the time segment or the frequency range.

13. The system of claim 9, further comprising:
determining an eccentricity of the tubing that defines an offset of a position of the tubing from the center of the wellbore,
wherein determining the converted mode comprises determining the converted mode based on the eccentricity.

14. The system of claim 9, wherein evaluating the property of the cement comprises evaluating a bonding condition of the cement.

15. The system of claim 14, wherein evaluating the bonding condition of the cement comprises determining whether the bonding condition is at least one of a fully bonded condition, a free pipe condition, and a partially bonded condition.

16. A non-transitory computer-readable storage medium having instructions stored therein, which, when executed by a computer, cause the computer to perform a plurality of functions, including functions to:
emit, from at least one transmitter of a downhole tool positioned along a wellbore having a cement bond, a first acoustic transmission and outward to the cement such that at least a portion of the first acoustic transmission penetrates the cement;
detect, by a receiver array of the downhole tool, a first acoustic response that is derived from the first acoustic transmission;
determine a multimode wellbore resonance based on the first acoustic response,
wherein, in response to the first acoustic transmission penetrating the cement, a first mode of the multimode wellbore resonance is converted into a second mode different from the first mode;
detect, by the receiver array, a second acoustic response derived from the converted mode of the multimode wellbore resonance;
determine the converted mode based on the second acoustic response, wherein the second acoustic response is a first mode and the converted mode is a second mode; and
evaluate a property of the cement based on the multimode wellbore resonance and the converted mode.

17. The computer-readable storage medium of claim 16, wherein a frequency of the multimode wellbore resonance corresponds to a dimension and material property of the wellbore.

18. The computer-readable storage medium of claim 16, wherein an amplitude of the converted mode corresponds to a size of a fluid channel in the cement.

19. The computer-readable storage medium of claim 16, further comprising functions to:
generate a decomposed response based on the first acoustic response and the second acoustic response,
wherein determining the converted mode comprises:
selecting at least one of a time segment or a frequency range of decomposed response based on an azimuthal direction where the channel is located in the cement; and
evaluating the property of the cement based on the selected at least one of the time segment or the frequency range.

20. The computer-readable storage medium of claim 16, wherein evaluating the property of the cement comprises evaluating a bonding condition of the cement.

* * * * *